(12) United States Patent
Timmons et al.

(10) Patent No.: US 10,728,781 B2
(45) Date of Patent: Jul. 28, 2020

(54) NOTIFICATION SIGNAL DISRUPTION DIAGNOSIS AND REPAIR

(71) Applicant: Slack Technologies, Inc., San Francisco, CA (US)

(72) Inventors: Andrew Timmons, San Francisco, CA (US); Jonathan Schear, Brooklyn, NY (US); Kaya Thomas Wilson, Oakland, CA (US); Shannon Tinkley, Vancouver (CA); Matthew Wahl, San Francisco, CA (US)

(73) Assignee: Slack Technologies, San Francisco, CA (US)

( * ) Notice: Subject to any disclaimer, the term of this patent is extended or adjusted under 35 U.S.C. 154(b) by 0 days.

(21) Appl. No.: 16/431,637

(22) Filed: Jun. 4, 2019

(65) Prior Publication Data
US 2019/0373491 A1 Dec. 5, 2019

Related U.S. Application Data

(60) Provisional application No. 62/680,507, filed on Jun. 4, 2018.

(51) Int. Cl.
*H04W 24/00* (2009.01)
*H04W 24/08* (2009.01)
*H04L 29/08* (2006.01)

(52) U.S. Cl.
CPC ............ *H04W 24/08* (2013.01); *H04L 67/20* (2013.01); *H04L 67/26* (2013.01)

(58) Field of Classification Search
CPC ......... H04W 24/08; H04L 67/20; H04L 67/26
See application file for complete search history.

(56) References Cited

U.S. PATENT DOCUMENTS

| | | | |
|---|---|---|---|
| 8,620,385 B2 | 12/2013 | Counts et al. | |
| 9,160,550 B1 | 10/2015 | Morrison et al. | |
| 2017/0127213 A1* | 5/2017 | Hurst | ....................... H04W 4/50 |
| 2017/0201850 A1 | 7/2017 | Raleigh et al. | |
| 2018/0287982 A1 | 10/2018 | Draeger et al. | |
| 2019/0253849 A1* | 8/2019 | Ryder | ..................... G06F 16/27 |

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.

(Continued)

*Primary Examiner* — Khai M Nguyen
(74) *Attorney, Agent, or Firm* — Lee & Hayes, P.C.

(57) ABSTRACT

Apparatuses, systems, and methods are provided that enable automatic diagnosis and repair of notification signal disruptions associated with a mobile device and a mobile application stored thereon.

20 Claims, 17 Drawing Sheets

(56) References Cited

OTHER PUBLICATIONS

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, Wikipedia, , [online][retrieved May 30, 2019]. Retrieved from the Internet: <URL: https://en.wikipedia.org/wiki/Internet_Relay_Chat>. (dated May 28, 2019) 17 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

"Die, Email, Die! A Flickr Cofounder Aims to Cut Us All Some Slack", Readwriteweb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.

Matsumoto, T. et al., "Chocoa Communicator—A New Communication System Based on Awareness and Text Communications—", Fujitsu Sci. Tech. J., 36, 2, (Dec. 2000) 154-161.

* cited by examiner

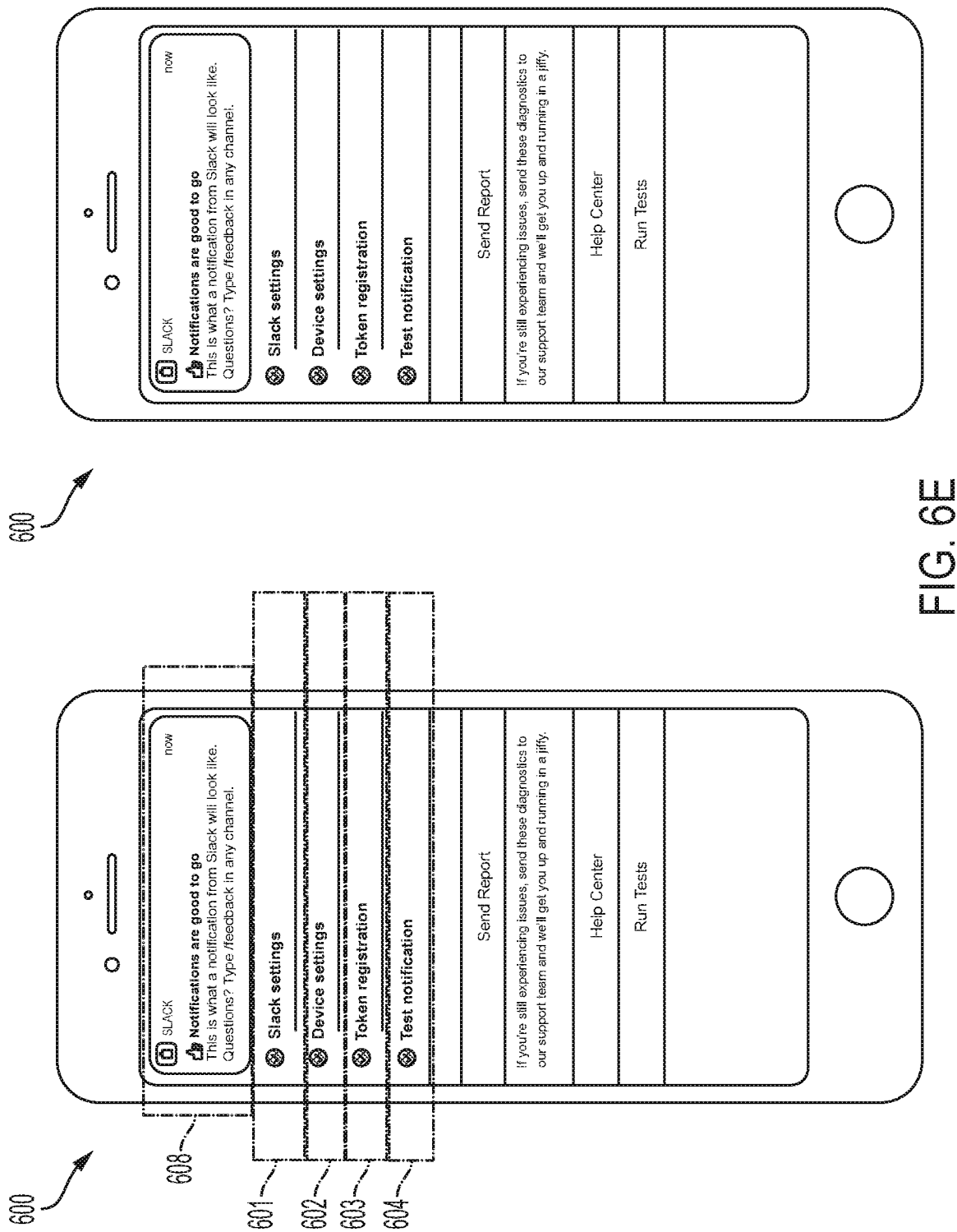

NOTIFICATION SIGNAL DISRUPTION DIAGNOSIS AND REPAIR

CROSS-REFERENCE TO RELATED APPLICATIONS

This application claims priority to U.S. Provisional Application No. 62/680,507, titled "NOTIFICATION SIGNAL ERROR DIAGNOSIS AND REPAIR," filed Jun. 4, 2018, the contents of which are incorporated herein by reference in their entirety.

BACKGROUND

Push notifications can be provided to mobile devices having mobile applications installed thereon. Diagnosis of failure by a mobile device to receive and/or display such push notifications is a manual and laborious task fraught with error. Through applied effort, ingenuity, and innovation, many of these identified deficiencies and problems have been solved by developing solutions that are in accordance with the embodiments of the present invention, many examples of which are described in detail herein.

BRIEF SUMMARY

In general, various embodiments provide methods and systems enabling a notification signal disruption diagnostic system for diagnosing and providing solutions to notification signal errors in the context of a mobile device application.

In embodiments, an apparatus for diagnosing notification signal disruptions comprises at least one processor and at least one memory storing instructions that, with the at least one processor, cause the apparatus to, in response to receiving a notification signal disruption diagnostic request, perform operations described herein.

In embodiments, the apparatus is configured to retrieve, from a local mobile device memory, mobile device level notification signal settings and mobile application level notification signal settings.

In embodiments, the apparatus is configured to transmit, to a network communication token provider, a network communication token registration request.

In embodiments, the apparatus is configured to receive, from the network communication token provider, a network communication token registration status message. In embodiments, the network communication token registration status message comprises one of a valid network communication token or a network communication token registration error.

In embodiments, the apparatus is configured to transmit, to a third party application provider, at least part of the network communication token registration status message.

In embodiments, the apparatus is configured to receive, from the third party application provider, a notification signal status. In embodiments, the notification signal status generated by the third party application provider based on the at least part of the network communication token registration status message.

In embodiments, the apparatus is configured to render, for display via a local mobile device display, a notification signal disruption diagnosis interface.

In embodiments, the notification signal disruption diagnosis interface comprises one or more of one or more notification signal disruption diagnoses, one or more notification signal disruption diagnosis explanations, or one or more notification signal disruption solutions.

In embodiments, a notification signal disruption diagnosis comprises one of a mobile device level notification signal disruption diagnosis, a mobile application level notification signal disruption diagnosis, or a network communication token disruption diagnosis.

In embodiments, the mobile application level notification signal settings are associated with a third party resource identifier.

In embodiments, the mobile device level notification signal settings comprise mobile application specific notification signal settings associated with the third party resource identifier.

In embodiments, the apparatus is further configured to determine a mobile device level notification signal disruption diagnosis by extracting the mobile application specific notification signal settings from the mobile device level notification settings, and generating the mobile device level notification signal disruption diagnosis based at least in part on at least one mobile application specific notification signal setting that is determined to prevent rendering of notification signals within the mobile device display.

In embodiments, the apparatus is further configured to determine a mobile application level notification signal disruption diagnosis by parsing the mobile application level notification signal settings, and generating the mobile application level notification signal disruption diagnosis based at least in part on at least one mobile application level notification signal setting that is determined to prevent rendering of notification signals within the mobile device display.

In embodiments, the notification signal disruption diagnosis interface comprises a mobile device level notification signal diagnosis pane, a mobile application level notification signal diagnosis pane, a network communication disruption diagnosis pane, and one or more notification signal disruption solution panes.

In embodiments, the apparatus is further configured to receive, from a network communication token provider, a test notification signal. In embodiments, the test notification signal is transmitted by the third party application provider to the network communication token provider using the valid network communication token.

In embodiments, the apparatus is further configured to receive, from the third party application provider, a notification signal status comprising one of a test notification signal success or a test notification signal failure.

In embodiments, the apparatus is further configured to determine a network communication token disruption diagnosis based at least on the notification signal status.

In embodiments, a notification signal disruption solution associated with the mobile device level notification signal disruption diagnosis comprises a mobile device level notification signal settings interface element with which a user of the mobile device may interact using the mobile device.

In embodiments, a notification signal disruption solution associated with the mobile application level notification signal disruption diagnosis comprises a mobile application level notification signal settings interface element with which a user of the mobile device may interact using the mobile device.

In embodiments, a notification signal disruption solution associated with the network communication token disruption diagnosis comprises a network communication token repair interface element.

In embodiments, the mobile device level notification signal disruption diagnosis is renderable within the mobile device level notification signal diagnosis pane, the mobile application level notification signal diagnosis disruption is renderable within the mobile application level notification signal diagnosis pane, the network communication disruption diagnosis is renderable within the network communication disruption diagnosis pane, and the one or more notification signal disruption solutions are renderable within the one or more notification signal disruption solution panes.

In embodiments, a mobile application level notification signal setting is one of a group-based communication channel specific notification signal setting, a group-based communication group specific notification signal setting, a group-based communication keyword specific notification signal setting, or a group-based communication user specific notification signal setting.

In embodiments, a mobile application specific notification signal setting is one of a group-based communication channel specific notification signal setting, a group-based communication group specific notification signal setting, a group-based communication keyword specific notification signal setting, or a group-based communication user specific notification signal setting.

BRIEF DESCRIPTION OF THE SEVERAL VIEWS OF THE DRAWINGS

Reference will now be made to the accompanying drawings, which are not necessarily drawn to scale, and wherein:

FIG. 6E illustrates an exemplary notification signal disruption diagnosis interface, for use with embodiments of the present disclosure.

DETAILED DESCRIPTION

Figure 1A:
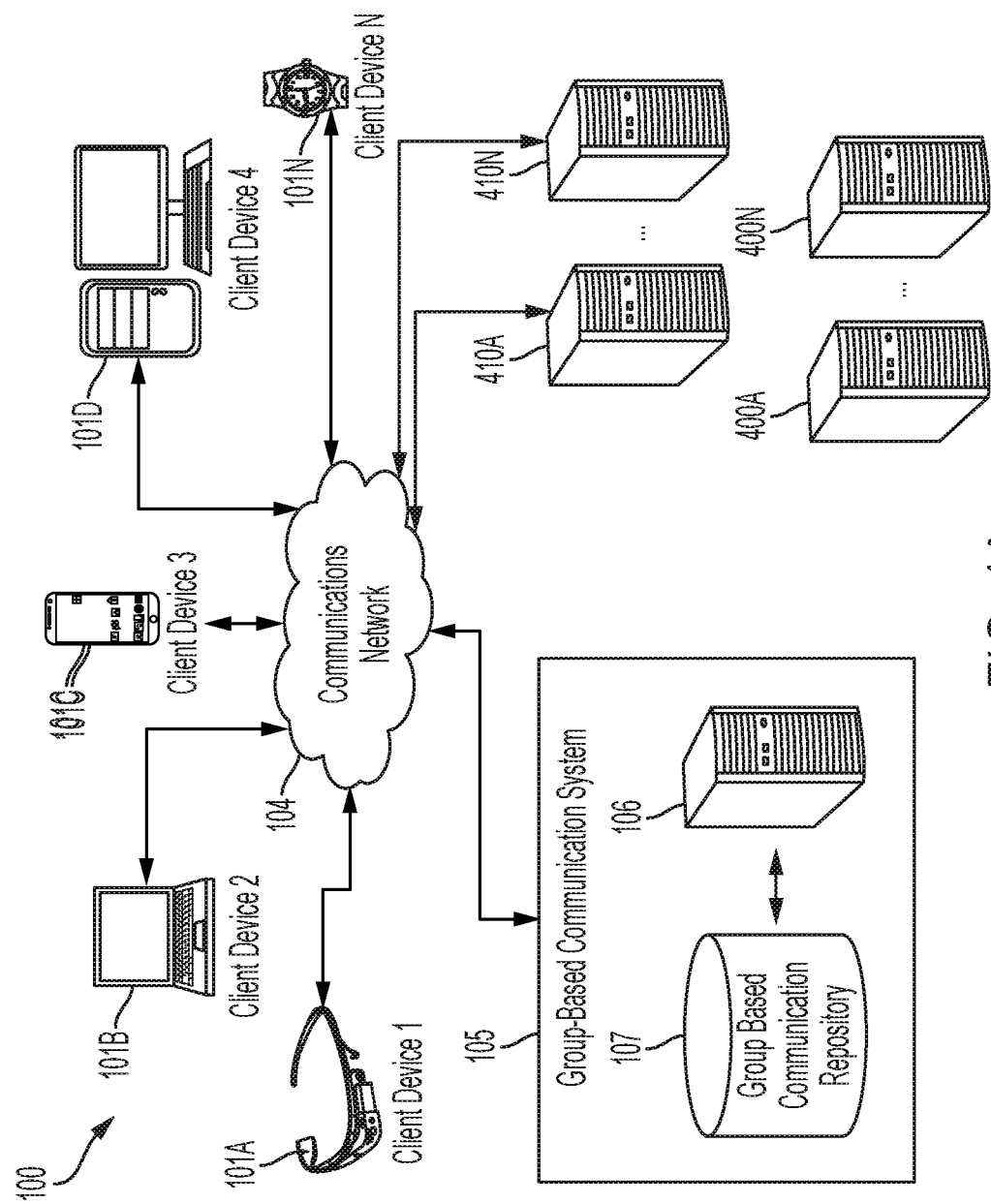
FIG. 1A illustrates an exemplary configuration of a group-based communication platform according to embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The term "client device" refers to computer hardware(s) and/or software(s) that is/are configured to access one or more services made available by one or more servers. The server(s) is/are often (but not always) on another computer system, in which case the client device accesses the service by way of a network. A client device may be associated with a group identification, where the group identification is an electronic indication that suggests a group (e.g., user group) that the user belongs to. Client devices may include, without limitation, smart phones, tablet computers, laptop computers, desktop computers, wearable devices, personal computers, enterprise computers, and the like.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows.

The term "group-based communication interface" is a graphical user interface of a group-based communication system that is configured to allow users to (e.g., group members) to view and engage a group-based communication platform. A group-based communication interface is rendered to a client device based on data and instructions provided by the group-based communication system (e.g., the group-based communication apparatus). In some embodiments, such data and instructions are facilitated by a dedicated software application running on the client device. In other embodiments, such data and instructions are provided through a web browser running on the client device. Each group-based communication interface may be visually configured to define a sidebar pane and a message pane.

The term "communication channel" refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users) for sharing messages among all users of the group.

Multiple communication channels may operate on each of one or more computing devices, and therefore a communication channel identifier may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels.

A communication channel may be "public," which may allow any client device to join and participate in the information sharing through the communication channel. A communication channel may be "private," which may restrict data communications in the communication channel to certain client devices and/or users.

A communication channel may reference a plurality of gateway servers and a single channel server, such that data exchanged among client devices on a common communication channel is replicated across each of the gateway servers referenced by the communication channel. In certain embodiments, a single gateway server may be referenced by a plurality of communication channels, and therefore the gateway servers may be configured for disseminating replicated data exchanged on a single communication channel based on channel identifiers associated with particular client devices, such that the transmitted data is displayed to users of client devices via a group-based communication channel interface.

The term "group-based communication channel interface" refers to a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel.

As used herein, the terms "messaging communication" and "message" refer to any electronically generated digital content object provided by a user using a client device and that is configured for display within a group-based communication channel interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

Messages for display within a group-based communication channel interface are "replicated" across devices within the group-based communication channel, including client devices, gateway servers, and/or channel servers. Replication causes copies of at least a portion of each message (including message content and/or attachments) to be created in memories associated with each of the devices associated with a group-based communication channel. The replicated copies may be generated by transmitting the message (e.g., copies of the message) from a single device (e.g., a single client device and/or a single interface controller) to a plurality of devices (e.g., a plurality of client devices and/or a plurality of gateway servers). However, it should be understood that messages may be replicated by transmitting a message from a single device to a separate, single device, and this process may be repeated one or more times to replicate a message among a plurality of devices. As discussed herein, message replication among a plurality of gateway servers enables messages to be shared with client devices within a common group-based communication channel that spans a plurality of gateway servers (e.g., each client device may communicate with a separate gateway server).

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "notification signal" refers to a transmission of content that is "pushed" from a remote server or mobile device application to a user interface of a mobile device. For example, a notification signal (i.e., push notification) can be received from a remote server by a mobile device in order to call a user's attention to particular content. By way of further example, the notification signal may be rendered, by the mobile device, in a user interface within a display of the mobile device to call the user's attention to particular content. The notification signal may be rendered within a particular mobile device application, and the notification signal may be rendered outside of the particular mobile device application. The notification signal may also be in the form of a sound or vibration of a mobile device (with or without rendering within the interface). Examples of notification signals include messages, badges, icons, sounds, vibrations, custom text alerts, and the like.

The terms "notification signal error" or "notification signal disruption" refers to a disruption in delivery of notification signals to a mobile device operated by a particular and/or a disruption of delivery (i.e., rendering or otherwise) of the notification signals to the user of the mobile device (i.e., by way of interface rendering, sounds, vibrations, or other tactical feedback).

The term "notification signal settings" refers to rules governing what notification signals should be delivered to a mobile device, rendered within a user interface of a mobile device, and/or presented via other means using a mobile device (i.e., sounds, vibrations, and the like). Notification signal settings can be selected at the mobile device level (i.e., via a settings interface specific to the mobile device, or by manufacturer default), or at the mobile application level (i.e., via a settings interface specific to a particular mobile application, or by developer default).

The term "mobile device level notification signal settings" refers to notification signal settings specific to a mobile device. The mobile device notification level signal settings may be configurable by a user of the mobile device, and may be set to a manufacturer default. Mobile device level notification signal settings may also be associated with an operating system (OS) of the mobile device. For example, on Apple™ devices, notification signal settings may comprise disabling of alerts, badges, or sounds associated with notification, where the notification signal settings are defined at the OS level.

The terms "mobile device application" or "third party resource" refer to a computer program or software application designed to execute on a mobile device such as a phone, tablet, wearable, or the like. Mobile device applications can be downloaded via accessing websites, can be preinstalled on a device, or can be downloaded via application distribution platforms.

The term "third party resource identifier" refers to one or more items of data by which a third party resource or mobile device application may be uniquely identified.

The terms "third party resource provider" and "mobile application provider" refer to a computing entity responsible for providing access to a third party resource or mobile device application by a mobile device. A third party resource provider may be a developer, an application hosting service, or the like. In embodiments, a third party resource provider may be a group-based communication platform. (i.e., Slack®).

The term "mobile application level notification signal settings" refers to notification signal settings specific to a mobile device application. The mobile application notification signal settings may be configurable by a user of the mobile device at the time of installation or initial loading of a mobile device application, they may be revised by the user of the mobile device after installation of loading, and they may be set to an application developer default.

The term "mobile application specific notification signal settings" refers to notification signal settings of mobile device level notification signal settings that are specific to a third party resource (i.e., a mobile application).

The term "mobile device type identifier" refers to one or more items of data by which a mobile device type may be uniquely identified. For example, a mobile device type identifier may be associated with mobile device types having a particular operating system running on the mobile device. For example, a first mobile having a first mobile device type may have running thereon an operating system associated with Apple® (e.g., iOS), while a second mobile device having a second mobile device type may have running thereon an operating system associated with Google® or Android® (e.g., Android). A mobile device type identifier enables the present system to detect whether a mobile device under evaluation is associated with a particular mobile device type and thereby make a correct decision as to what evaluation workflow to execute.

The term "device specific notification router" refers to a notification routing service that may be installed on a mobile device, where the device specific notification router is configured to received notification signals that are delivered to the mobile device, and then route the received notification signals to an appropriate mobile application with which the notification signals are associated. For example, Google® provides an SDK called "Play Services"® (e.g., a notification router) on Android® devices (e.g., device specific). In examples, a device specific notification router may experience issues that result in disruption of notification signal delivery to particular mobile applications. In other examples, a device specific notification router may not be present or available on the mobile device, where it should be present/available and functioning. The present system performs a check to determine whether a device specific notification router is present and properly functioning on a particular mobile device having a mobile device type identifier associated with mobile device types requiring a device specific notification router.

The terms "network communication token provider node," "network communication token provider," "push notification service," and "network communication token authority" refer to a platform notification service that enables third party application developers to send notification data (i.e., notification signals) to applications installed on certain mobile devices. The enablement is implemented through the use of network communication tokens. In embodiments, examples of network communication token provider nodes can be provided by Apple Push Notifications Service®, Firebase or Google Cloud Messaging®, or Windows Push Notification Service®. In embodiments, the network communication token provider node can invalidate a network communication token at any time. Such invalidation can result in disruption of delivery of push notification signals to a mobile device.

The terms "network communication token," "token," "push token," and "security token" refer to a security mechanism that is one or more items of data that is authorized to an application provider (i.e., a third party application installed on a mobile device) by a network communication token provider to allow the application provider to successfully transmit push notifications (i.e., notification signals) to a given mobile device.

The term "group-based communication channel specific notification signal settings" refers to notification signal settings that are associated with a particular group-based communication channel identifier. For example, only those notification signals associated with a particular group-based communication channel identifier may be authorized for transmission to a particular computing device associated with a group-based communication user. By way of further example, any notification signals associated with a different group-based communication channel identifier may not be authorized for transmission to a particular computing device associated with a group-based communication user. By way of further example, only those notification signals associated with a particular group-based communication channel identifier may be authorized for rendering by a particular computing device associated with a group-based communication user, and any notification signals associated with a different group-based communication channel identifier may not be authorized for rendering by a particular computing device associated with a group-based communication user.

The term "group-based communication group specific notification signal settings" refers to notification signal settings that are associated with a particular group-based communication group identifier. For example, only those notification signals associated with a particular group-based communication group identifier may be authorized for transmission to a particular computing device associated with a group-based communication user. By way of further example, any notification signals associated with a different group-based communication group identifier may not be authorized for transmission to a particular computing device associated with a group-based communication user. By way of further example, only those notification signals associated with a particular group-based communication group identifier may be authorized for rendering by a particular computing device associated with a group-based communication user, and any notification signals associated with a different group-based communication group identifier may not be authorized for rendering by a particular computing device associated with a group-based communication user.

The term "group-based communication keyword specific notification signal settings" refers to notification signal settings that are associated with a particular keyword within a group-based communication system. For example, only those notification signals associated with a particular keyword may be authorized for transmission to a particular computing device associated with a group-based communication user. As an example, a notification signal may be considered associated with a particular keyword because the particular keyword appears in a group-based communication channel (e.g., in a group-based communication message, in a file, etc.). By way of further example, any notification signals associated with a different keyword may not be authorized for transmission to a particular computing device associated with a group-based communication user. By way of further example, only those notification signals associated with a particular keyword may be authorized for rendering by a particular computing device associated with a group-based communication user, and any notification signals associated with a different keyword may not be authorized for rendering by a particular computing device associated with a group-based communication user.

The term "group-based communication user specific notification signal settings" refers to notification signal settings that are associated with a particular group-based communication user identifier. For example, only those notification signals associated with a particular group-based communication user identifier may be authorized for transmission to a particular computing device associated with a group-based communication user. By way of further example, any notification signals associated with a different group-based communication user identifier may not be authorized for transmission to a particular computing device associated with a group-based communication user. By way of further example, only those notification signals associated with a particular group-based communication user identifier may be authorized for rendering by a particular computing device associated with a group-based communication user, and any notification signals associated with a different group-based communication channel user may not be authorized for rendering by a particular computing device associated with a group-based communication user.

The term "notification signal disruption diagnostic request" refers to one or more items of data received by a notification signal disruption system or mechanism, where the data represents a request to evaluate notification signal settings and network communication token status associated with a particular mobile device (or mobile application stored thereon) to determine a root cause for any disruptions in notification signal receipt and/or rendering by the mobile device. The notification signal disruption diagnostic request may be associated with various metadata, including a network timestamp associated with when the request was submitted via the mobile device, a mobile device identifier, a mobile application identifier, a user identifier, a push token, a group-based communication group or team identifier, and the like.

The term "network communication token registration request" refers to a network transmission of one or more items of data to a network communication token provider, where the request is for registration of a particular mobile device (in combination with a particular mobile application) with the network communication token provider.

The term "network communication token registration status message" refers to a network transmission of one or more items of data received from a network communication token provider indicative of whether a request for authorizing a third party mobile application provider to transmit push notifications to a mobile device is successful or not.

The term "valid network communication token" refers to a network communication token that may be used by a third party resource or mobile application provider to transmit notification signals through a network communication token provider to a mobile device associated with the valid network communication token and mobile application provided by the mobile application provider. The valid network communication token represents an authorization provided by the network communication token provider, where the authorization is associated with a mobile device, a mobile application, and a mobile application provider.

The term "network communication token registration error" refers to a failed attempt to register with a network communication token provider by a mobile device associated with a mobile device application. The network communication token registration error may be a result of a network/request timeout, or some other invalidation of a network communication token.

The term "notification signal status" refers to one or more items of data transmitted from a third party resource or mobile application provider, where the one or more items of data represent a success of failure of a transmission of a notification signal from the third party resource or mobile application provider to a particular mobile device (e.g., by way of a network communication token provider, using a network communication token).

The term "notification signal disruption diagnosis interface" refers to a graphical user interface that is configured to allow users to view and engage a notification signal disruption diagnosis mechanism or process. A notification signal disruption diagnosis interface is rendered to a client device based on data and instructions provided by the notification signal disruption mechanism. In some embodiments, such data and instructions are facilitated by a dedicated software application running on the client device. Each notification signal disruption diagnosis interface is visually configured to define a mobile device level notification signal diagnosis pane, a mobile application level notification signal diagnosis pane, a network communication disruption diagnosis pane, and a notification signal disruption solution pane.

A "mobile device level notification signal diagnosis pane" is configured to display one or more mobile device level notification signal disruption diagnoses, one or more indications that mobile device level notification signal settings are not responsible for notification signal disruptions, one or more diagnoses statuses (i.e., "in progress," "complete," and the like), and/or one or more mobile device level notification signal disruption diagnosis explanations (i.e., explanations for why mobile device level signal settings may be responsible for a disruption in notification signals).

A "mobile application level notification signal diagnosis pane" is configured to display one or more mobile application level notification signal disruption diagnoses, one or more indications that mobile application level notification signal settings are not responsible for notification signal disruptions, one or more diagnoses statuses (i.e., "in progress," "complete," and the like), and/or one or more mobile application level notification signal disruption diagnosis explanations (i.e., explanations for why mobile application level signal settings may be responsible for a disruption in notification signals).

A "mobile device specific notification router diagnosis pane" is configured to display one or more mobile device specific notification router diagnoses, one or more indications that mobile device specific notification router issues are not responsible for signal disruptions, one or more diagnoses statuses (i.e., "in progress," "complete," and the like), and/or one or more mobile device specific notification router diagnosis explanations (i.e., explanations for why mobile device specific notification router issues may be responsible for a disruption in notification signals).

A "network communication disruption diagnosis pane" is configured to display one or more network communication disruption diagnoses, one or more indications that network communication token issues are not responsible for notification signal disruptions, one or more diagnoses statuses (i.e., "in progress," "complete," and the like), and/or one or more network communication disruption diagnosis explanations (i.e., explanations for why network communication token issues may be responsible for a disruption in notification signals)

A "notification signal disruption solution pane" is configured to display one or more notification signal disruption solutions. For example, a notification signal disruption solution pane may include text explaining how any notification signal settings may be modified in order to eliminate notification signal disruptions. A notification signal disruption solution pane may further include one or more hyperlinks configured to direct a user to additional information or resources for resolving notification signal disruptions.

The terms "notification signal disruption diagnosis" and "notification signal disruption diagnoses" refer to data representative of possible root causes associated with notification signal disruptions for a particular mobile device. For example, a notification signal disruption diagnosis may represent that mobile device level notification signal settings may be responsible for disruptions of notification signals (i.e., a "mobile device level notification signal disruption diagnosis"). The notification signal disruption diagnosis may represent that mobile application level notification signal settings may be responsible for disruptions of notification signals (i.e., a "mobile application level notification signal disruption diagnosis"). The notification signal disruption diagnosis may represent that network communication token issues may be responsible for disruptions of notification signals (i.e., a "network communication token disruption diagnosis"). A notification signal disruption diagnosis may comprise a data structure including a plurality of data elements associated with additional information related to the notification signal disruption diagnosis (i.e., one or more "notification signal disruption diagnosis explanations").

The term "notification signal disruption solution" refers to one or more items of data representing steps that may be performed using a mobile device to resolve a particular notification signal disruption diagnosis. For example, a notification signal disruption solution may include text or other data explaining or representing that mobile device level notification signal settings need to be modified in order to eliminate disruption of notification signals for a particular mobile device. A notification signal disruption solution may include text or other data explaining or representing that mobile application level notification signal settings need to be modified in order to eliminate disruption of notification signals for a particular mobile device. A notification signal disruption solution may include text or other data explaining or representing that a replacement or otherwise valid network communication token needs to be registered with or received from a network communication token provider in order for disruption of notification signals at the mobile device to be eliminated.

The term "test notification signal" refers to a notification signal generated by a third party resource or mobile application provider and transmitted to a mobile device (by way of a network communication token provider using a network communication token) in order to test or confirm that the network communication token used for the transmission is valid and that notification signals are being delivered to the mobile device. For example, the mobile device transmits a request (comprising a network communication token) to a third party resource or mobile application provider, and the third party resource or mobile application provider responds by transmitting a notification signal to a network communication token provider, using the network communication token. If the network communication token is valid, the notification signal is successfully delivered to the mobile device.

The term "test notification signal success" refers to data representing that a test notification transmission from a third party resource or mobile application provider was successfully received by a mobile device for which the test notification was intended.

The term "test notification signal failure" refers to data representing that a test notification transmission from a third party resource or mobile application provider was not successfully received by a mobile device for which the test notification was intended.

The term "mobile device level notification signal settings interface element" refers to a graphical user interface element that is configured to enable a user of a mobile device to access and modify mobile device level notification signal settings.

The term "mobile application level notification signal settings interface element" refers to a graphical user interface element that is configured to enable a user of a mobile device to access and modify mobile application level notification signal settings.

The term "network communication token repair interface element" refers to a graphical user interface element that is configured to enable a user to repair any network communication token issues associated with disruption of notifications signals to the user's mobile device.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107. In embodiments, the group-based communication server 106 may comprise a notification signal disruption diagnostic system according to embodiments of the present disclosure. In embodiments, the client devices 101A-101N may have comprise a notification signal disruption diagnostic mechanism according to embodiments of the present disclosure.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the enterprise group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to an group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., an enterprise group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>
www.mydigitalcertificate.com/JohnDoeDaDoeDoe@gmail.com/
mycertifcate.dc</digital_cert_link>
            //OPTIONAL <digital_certificate>_DATA_</
            digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS
7_1_1 like Mac OS X) AppleWebKit/537.51.2 (KHTML, like Gecko)
Version/7.0 Mobile/11D201 Safari/9537.53</user_agent_string>
        <client_product_type>iPhone6,1</client_product_type>
        <client_serial_number>DNXXX1X1XXXX</
        client_serial_number>
    <client_UDID>3XXXXXXXXXXXXXXXXXXXXXXXXD</
    client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
```

-continued

```
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS
7_1_1 like Mac OS X) AppleWebKit/537.51.2 (KHTML, like Gecko)
Version/7.0 Mobile/11D201 Safari/9537.53</user_agent_string>
        <client_product_type>iPhone6,1</client_product_type>
        <client_serial_number>DNXXX1X1XXXX</
        client_serial_number>
        <client_UDID>3XXXXXXXXXXXXXXXXXXXXXXXXD</
        client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4;
en-us; Nexus S Build/IMM76D) AppleWebKit/534.30 (KHTML,
like Gecko) Version/4.0 Mobile Safari/534.30</user_agent_string>
        <client_product_type>Nexus S</
        client_product_type>
        <client_serial_number>YXXXXXXXXXZ</
        client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X
10_9_3) AppleWebKit/537.75.14 (KHTML, like Gecko)
Version/7.0.3 Safari/537.75.14</user_agent_string>
        <client_product_type>MacPro5,1</client_product_type>
        <client_serial_number>YXXXXXXXXXZ</
        client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a
copy our patent policy.</contents>
        <attachments>patent_policy.pdf</attachments>
    </message>
</auth_request>
```

The group-based communication system 105 comprises at least one group-based communication server 106 that may create a storage message based upon the received message to facilitate message indexing and storage in an group-based communication repository 107. In one implementation, the storage message (i.e., a group-based communication message data structure) may include data such as a message identifier, a group identifier, a group-based communication channel identifier, a sending user identifier, topics, responses, message contents, attachments, message hierarchy data, third party metadata, conversation primitive data, and/or the like. For example, the group based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a copy
our patent policy.</contents>
    <attachments>patent_policy.pdf</attachments>
    <conversation_primitive>
        conversation includes messages: ID_message_8,
ID_message_9, ID_message_10,
        ID_message_11, ID_message_12
    </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the enterprise group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

In embodiments of the present disclosure, a group-based communication system 105 enables the provision of mobile application push notifications (i.e., notification signals) via communications network 104 through the use of remote third party application server nodes 400A-400N and network communication token provider nodes 410A-410N. The group-based communication system further enables diagnosing and providing solutions to notification signal errors or disruptions in the context of a mobile device application (for example, Slack®) at a mobile device.

Figure 1B:
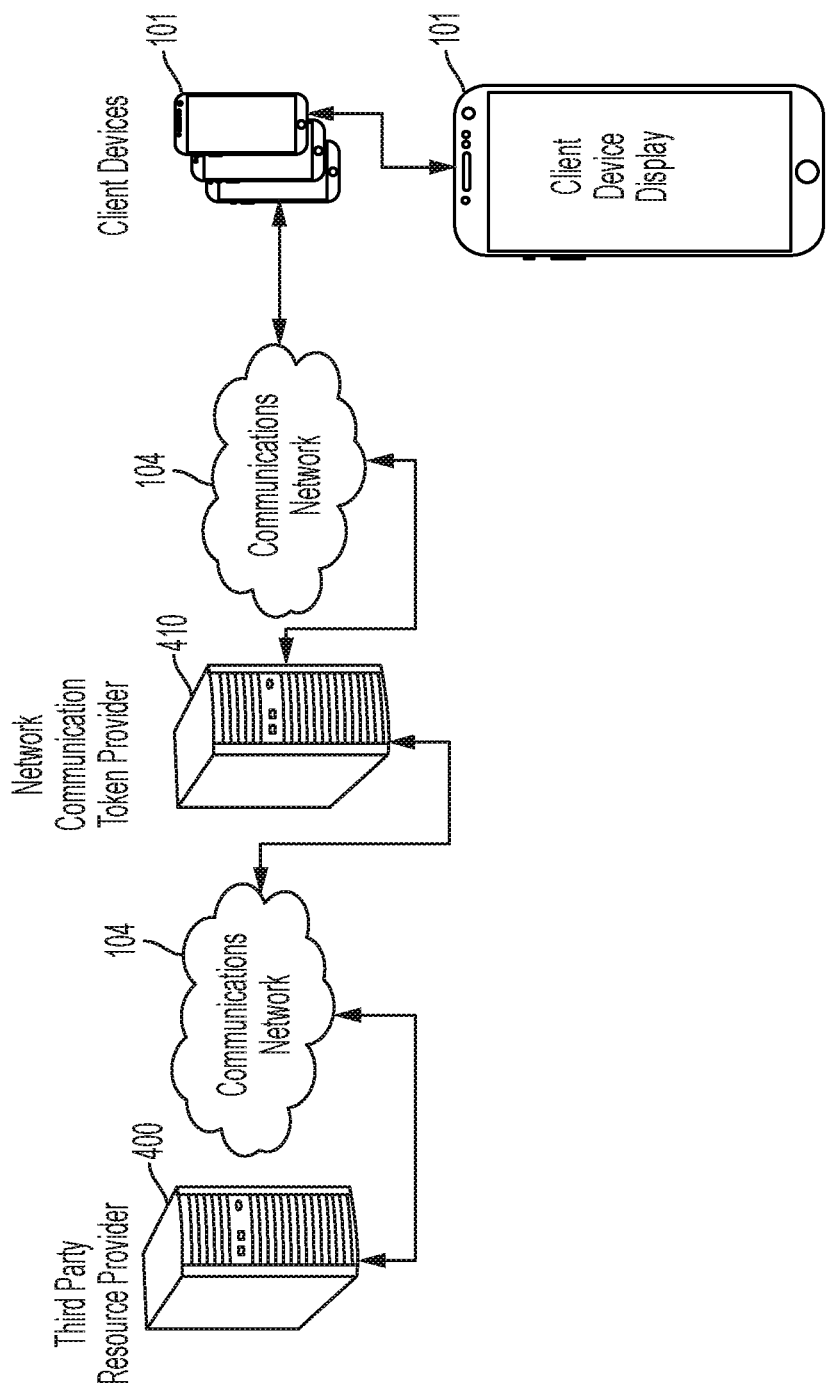
FIG. 1B illustrates an exemplary configuration of a notification signal delivery platform according to embodiments.

Depicted in FIG. 1B, embodiments of the present disclosure further relate to provision of push notification signals via communications network 104 through the use of network communication token providers 410 (i.e., push notification services) and third party resource providers 400. For example, third party resource providers 400 may transmit notification signals to particular client devices 101 by way of the network communication token providers 410 (e.g., using valid network communication tokens associated with a client device 101 that is registered with the network communication token provider 410).

Example Apparatuses for Implementing Embodiments of the Present Disclosure

Figure 2A:
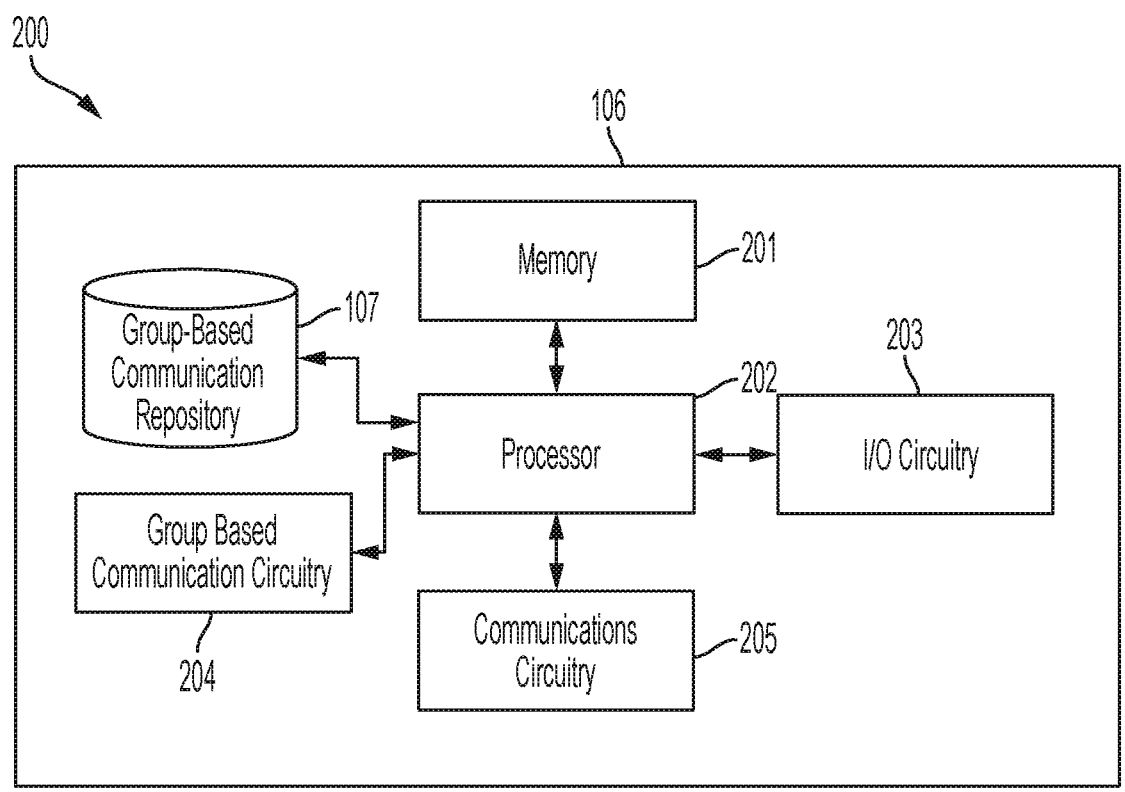
FIG. 2A illustrates a schematic of an exemplary hardware apparatus of an exemplary group-based communication server according to embodiments.

The group-based communication server 106 may be embodied by one or more computing systems, such as apparatus 200 shown in FIG. 2A. The apparatus 200 may include a processor 202, a memory 201, input/output circuitry 203, communications circuitry 205, group-based communication repository 107 and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or coprocessor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

Figure 2B:
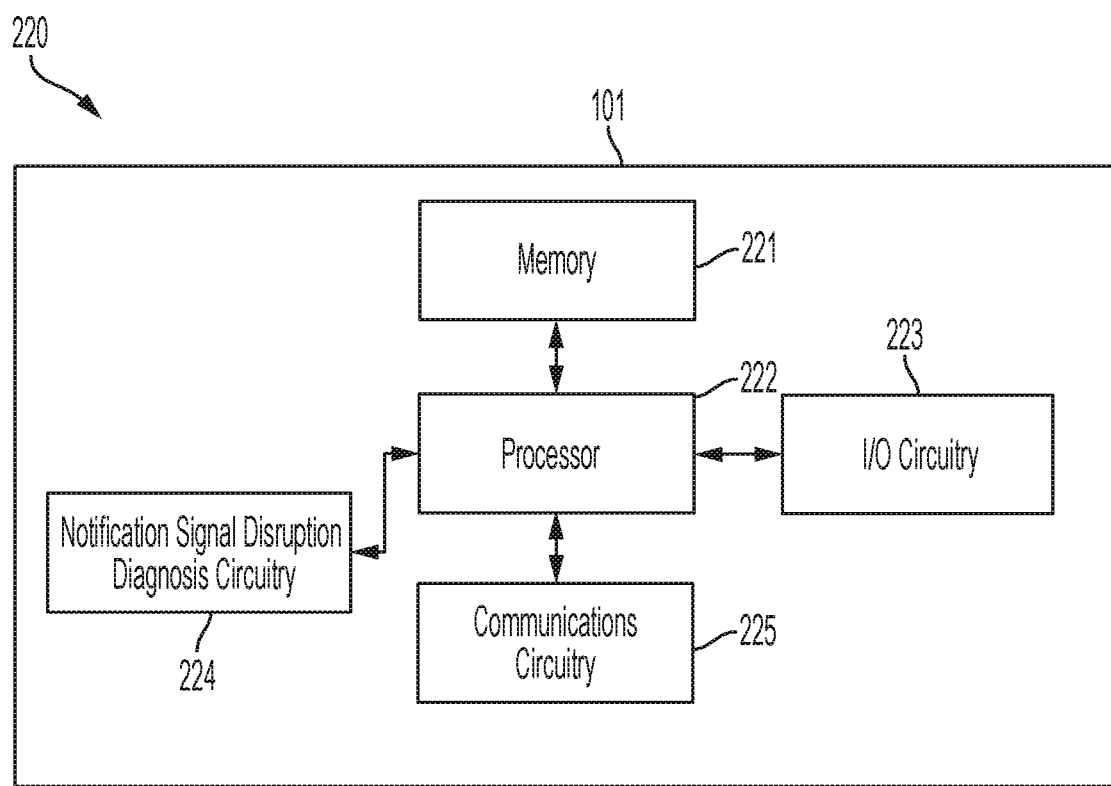
FIG. 2B illustrates a schematic of an exemplary hardware apparatus of an exemplary mobile device according to embodiments.

A client device 101A-101N (i.e., mobile computing device or mobile device) may be embodied by one or more computing systems, such as apparatus 220 shown in FIG. 2B. The apparatus 220 may include a processor 222, a memory 221, input/output circuitry 223, communications circuitry 225, and notification signal disruption diagnosis circuitry 224. The apparatus 220 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 220 may provide or supplement the functionality of particular circuitry. For example, the processor 222 may provide processing functionality, the memory 221 may provide storage functionality, the communications circuitry 225 may provide network interface functionality, and the like.

In some embodiments, the processor 222 (and/or coprocessor or any other processing circuitry assisting or otherwise associated with the processor) may be in communication with the memory 221 via a bus for passing information among components of the apparatus. The memory 221 may be non-transitory and may include, for example, one or more volatile and/or non-volatile memories. In other words, for example, the memory may be an electronic storage device (e.g., a computer readable storage medium). The memory 221 may be configured to store information, data, content, applications, instructions, or the like, for enabling the apparatus to carry out various functions in accordance with example embodiments of the present disclosure.

The processor 222 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 222 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 220 may include input/output circuitry 223 that may, in turn, be in communication with processor 222 to provide output to the user and, in some embodiments, to receive an indication of a user input. The input/output circuitry 223 may comprise a user interface and may include a display and may comprise a web user interface, a mobile application, a client device, a kiosk, or the like. In some embodiments, the input/output circuitry 223 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 221, and/or the like).

The communications circuitry 225 may be any means such as a device or circuitry embodied in either hardware or a combination of hardware and software that is configured to receive and/or transmit data from/to a network and/or any other device, circuitry, or module in communication with the apparatus 220. In this regard, the communications circuitry 225 may include, for example, a network interface for enabling communications with a wired or wireless communication network. For example, the communications circuitry 225 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The notification signal disruption diagnosis circuitry 224 includes hardware configured to support diagnosing and resolution of notification signal disruptions associated with the apparatus 220. The notification signal disruption diagnosis circuitry 224 may utilize processing circuitry, such as the processor 222, to perform these actions. It should also be appreciated that, in some embodiments, notification signal disruption diagnosis circuitry 224 may include a separate processor, specially configured field programmable gate array (FPGA), or application specific interface circuit (ASIC).

Example System Operation Details

Push notification signals received and displayed by mobile devices, where the push notification signals are related to mobile device applications installed on the mobile devices, are of importance to mobile device users. Push notification signals are one of the highest ways to get engagement on mobile device applications. Various settings or other network scenarios may lead to a disruption of delivery of push notifications to a mobile device and/or to a user interface of the mobile device. Examples of reasons why push notification signals are not received or displayed include mobile device application level settings, mobile device level settings, network communication token registration issues, and automatic battery saving modes triggered by a mobile device with or without the knowledge of a user of the mobile device.

In the context of a group-based communication system, push notification configurations become increasingly complex, therefore disruption of push notification signals being displayed within a user interface of a mobile device becomes increasingly problematic. A group-based communication system enables a great degree of push notification signal customization. For example, a user can set up specific keywords in different group-based communication channels that the user would like to trigger push notification signals. A user can also set up group-based communication channel level notification settings (i.e., notifications are transmitted to the user's mobile device when events occur that are associated with particular group-based communication channel identifiers), group-based communication team level notification settings (i.e., notifications are transmitted to the user's mobile device when events occur that are associated with particular group-based communication team or group identifiers), group-based communication user level notification settings (i.e., notifications are transmitted to the user's mobile device when events occur that are associated with particular group-based communication users), and the like. To be clear, notifications are transmitted from the group-based communication system to the user's mobile device in order to be rendered via a user interface of the user's mobile device.

Figure 3A:
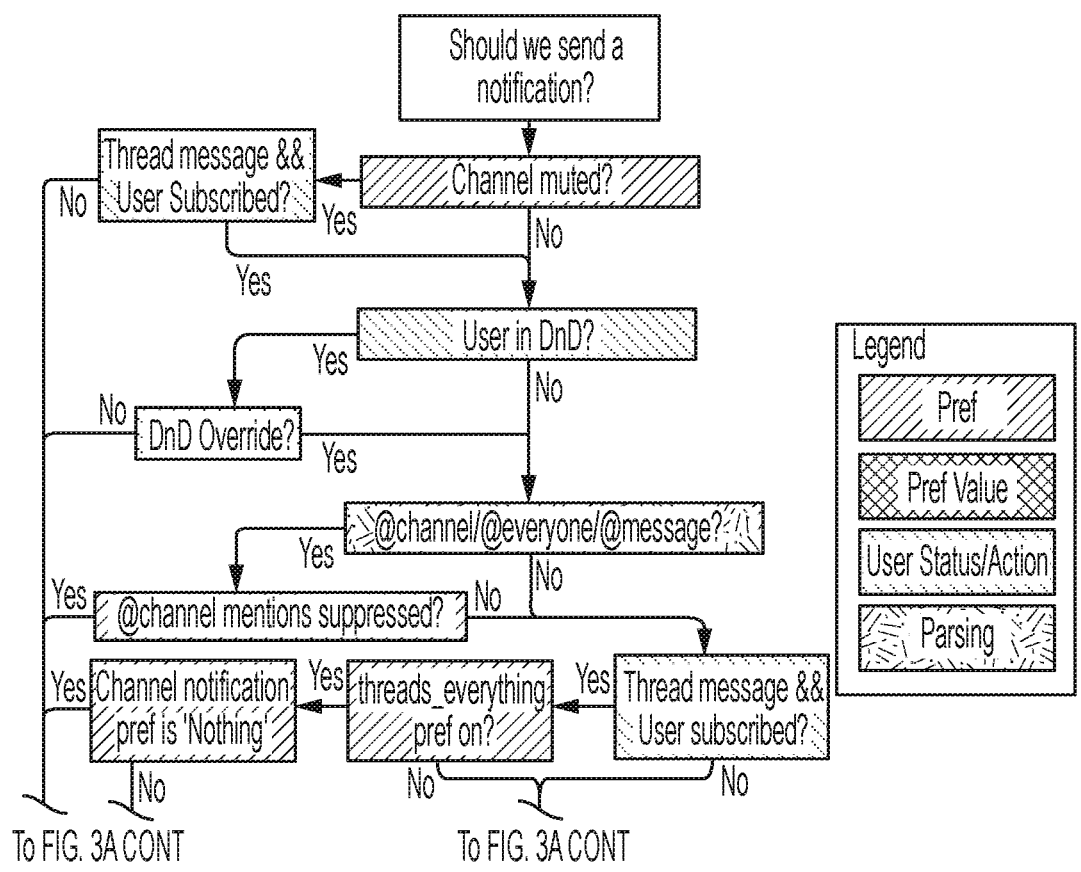
FIG. 3A illustrates an exemplary manual notification signal disruption diagnostic flow chart.
Figure 3A:
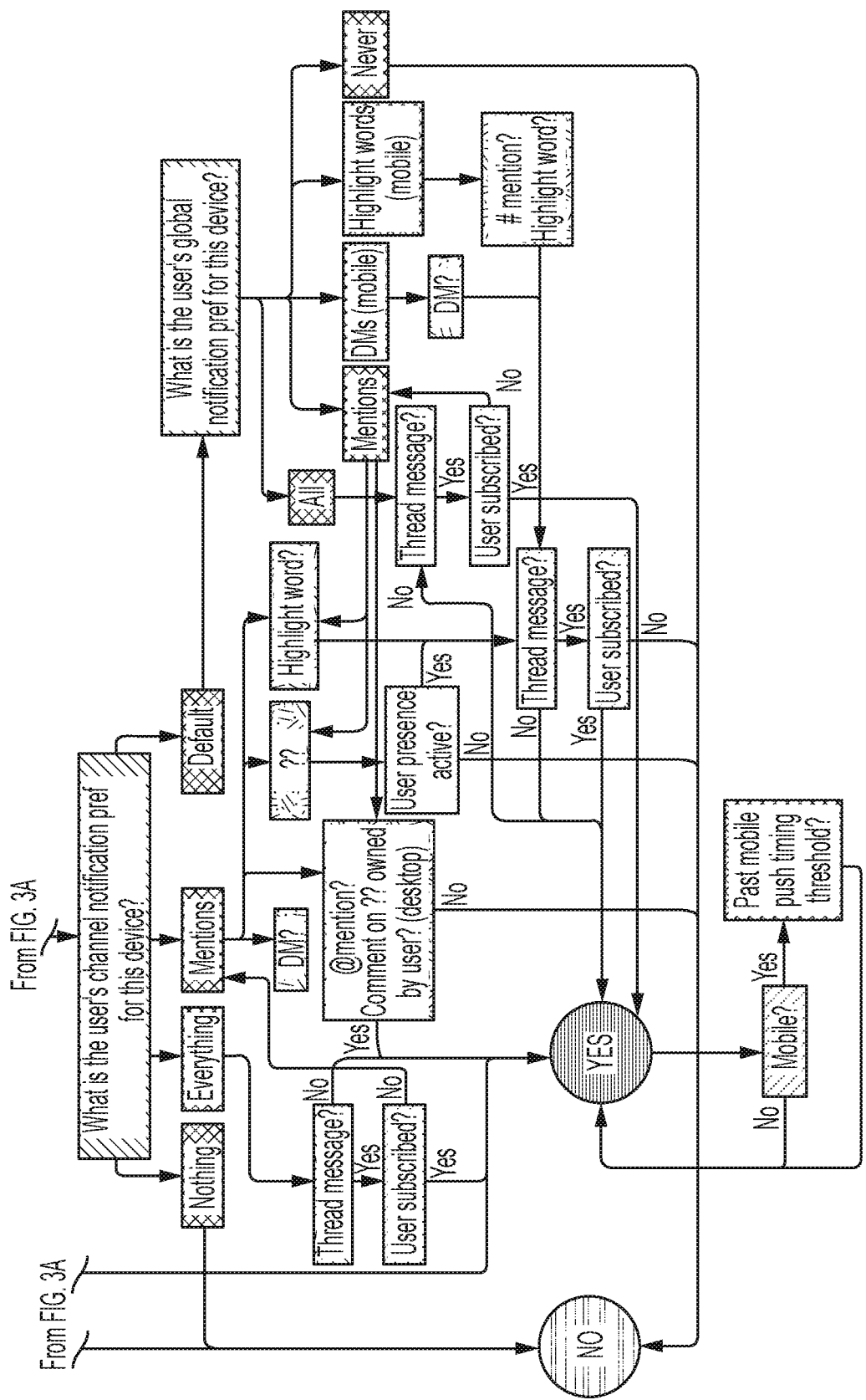
Figure 3B:
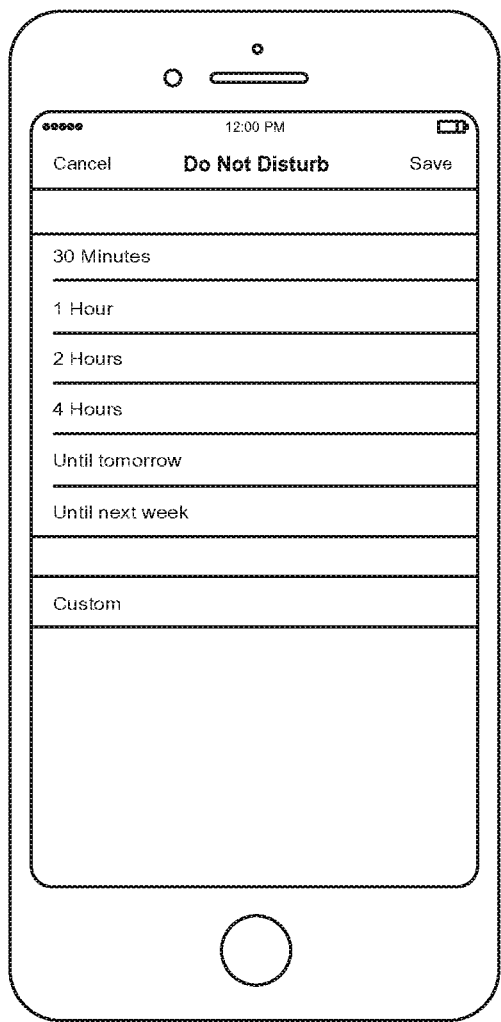
FIG. 3B illustrates exemplary mobile application level notification signal settings within an interface for use with embodiments of the present disclosure.
Figure 3C:
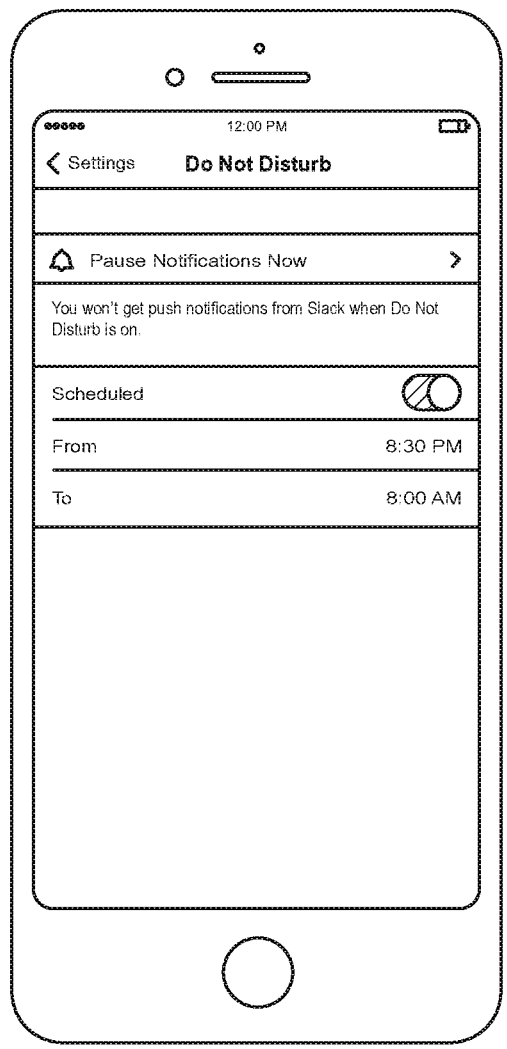
FIG. 3C illustrates exemplary mobile device level notification signal settings within an interface for use with embodiments of the present disclosure.
Figure 3D:
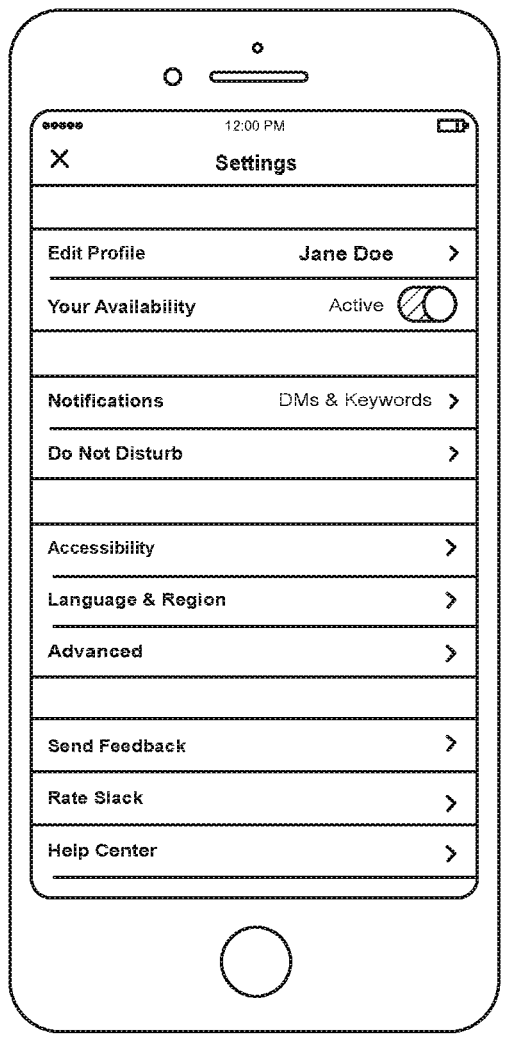
FIG. 3D illustrates exemplary mobile device level notification signal settings within an interface for use with embodiments of the present disclosure.
Figure 3E:
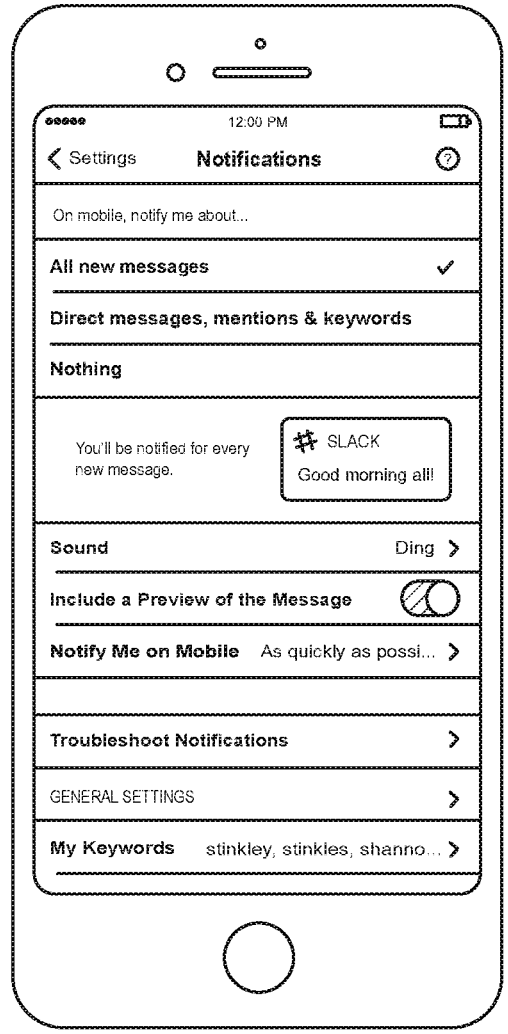
FIG. 3E illustrates exemplary mobile device level notification signal settings within an interface for use with embodiments of the present disclosure.

Current methods for diagnosing issues related to users not receiving push notification signals on their mobile devices require direct communication by the user to the provider of the mobile device application so that the provider can manually walk the user through figuring out what the problems are and how to solve them. Because of the complex variety of root causes associated with push notification disruption, such manual diagnostic methods require a significant amount of time and nuanced technical navigation of a mobile device that may not be within the skill set of a user of a mobile device. FIG. 3A illustrates such a complicated diagnostic flow chart.

Embodiments of the present disclosure provide significant technological improvements over existing systems. The present disclosure enables an increase in deliverability and display of push notification signals by repairing specific root causes associated with mobile devices. The present disclosure eliminates the need for the manual, tedious, and direct communication between a user of a mobile device and a third party application provider. The present disclosure reduces the amount of time necessary for diagnosing and repairing notification signal disruptions.

The present disclosure also enables a decrease in wasted memory at a group-based communication server (e.g., or third party mobile application provider server) for push notifications that would not arrive at a mobile device because of an expired network communication token. For example, push notification jobs are enqueued to an in-memory job queue at the group-based communication server for all push notification signals. Removing and replacing expired or otherwise "bad" network communication tokens results eliminates wasting of memory on push notification signals that have no chance of arriving at a mobile device.

As mentioned, various embodiments provide automated diagnosing and provision of solutions to notification signal errors or disruptions in the context of a mobile device application. A common issue faced by users of mobile devices having installed thereon a mobile device application (e.g., an interface provided by Slack®) is a lack of receiving push notifications (e.g., notification signals) or a lack of display of push notifications. Reasons for not receiving or the mobile device not displaying push notification signals vary due to several settings and/or technical issues. For example, a user may have disabled or "snoozed" notification signals in the settings specific for the mobile device application, or a user may have disabled or "snoozed" notification signals for the mobile device application at a device level (e.g., in Apple® or Android® settings on the mobile device). Disabling or "snoozing" notification signals can result from a user activating "Do Not Disturb" mode, which disables the receipt of push notifications from a mobile device application. Further issues arise from an expiration or revoking of a network communication token (e.g., push notification token). For example, Google®, Windows®, or Apple® provide items in the form of tokens, where the tokens authorize the provider of a mobile device application to transmit push notifications to a mobile device associated with an operating system provided by one of Google®, Windows®, or Apple® (or the like). Without a valid network communication token, a push notification transmitted from a mobile device application provider will not reach the intended mobile device.

When push notifications are delivered to but not rendered within a user interface of a mobile device for a particular user, data (e.g., group-based communication messages or other data objects that the particular user may be interested in) sits idle within the mobile device that may otherwise have been processed (e.g., interacted with) as a result of the particular user interacting with the mobile application associated with the data (in response to viewing or otherwise experiencing a push notification). Such idle data results in a waste of computing resources on the mobile device and downstream computing devices dependent upon interactions with the otherwise idle data, consuming memory and processing power that should be freed up for other computing needs.

The present disclosure relates to an interface renderable on a mobile device that enables diagnosing of issues surrounding a lack of receipt or display of notification signals by a user of a mobile device. The interface provides a selection that triggers execution of tests that run through each scenario that is known to have resulted in a lack of receipt or display of push notification signals. The interface then alerts the user to changes that can be made by the user, or that can be automatically performed, to fix the issue of the user not receiving or being able to view push notification signals.

By way of example, a third party mobile device application provider may decide to transmit a push notification signal to a mobile device that is already registered with the third party mobile device application. The push notification signal must go through a network communication token provider (e.g., Apple® push notification service, Google® push notification service, Windows® push notification service, or other device manufacturer push notification service). The network communication token provider then acts as a third party broker that then takes the payload (e.g., push notification signal) and transmits it out to the mobile device.

By way of further example, in iOS®, notification signal settings for a mobile device application (e.g., Slack®), may include various dependencies such as team level dependencies, group-based communication channel level dependencies, user level dependencies, and the like. Other settings may include do not disturb, snooze indefinitely, snooze for a particular period of time (e.g., 20 minutes, 30 minutes, etc.), specified work and non-work hours or days, and the like. Notification signal settings may also be set to some default or off entirely. Examples of mobile device level notification signal settings and mobile application level notification signal settings are illustrated in FIGS. 3B-3E. The present notification signal disruption diagnostic system can detect such settings and notify the user of exactly which settings may be responsible for the user not receiving or being able to view push notification signals so that the user may change the settings appropriately.

With regard to network communication token issues, without the present system, a customer experience team may spend days going back and forth with users of mobile devices trying to debug an issue with disrupted notification signals. The present notification signal disruption diagnostic system provides automatic detection of these network communication token issues.

To diagnose network communication token issues, the present notification signal disruption diagnostic system transmits a request, on behalf of the mobile device under diagnosis, to a network communication token provider node to register for remote notifications (i.e., notification signals associated with a third party resource or mobile application). The network communication token provider node determines whether the mobile device is eligible to register for remote notifications. The network communication token provider either responds by providing a network communication token or by providing an indication of an error. If a network communication token is transmitted to the mobile device, a current network communication token associated with the mobile device is updated using the newly provided network communication token. If an error is transmitted from the network communication token provider, the present system renders a notification to the user that token registration has failed and notifies the user to contact the network communication token provider to fix the issue.

Figure 4A:
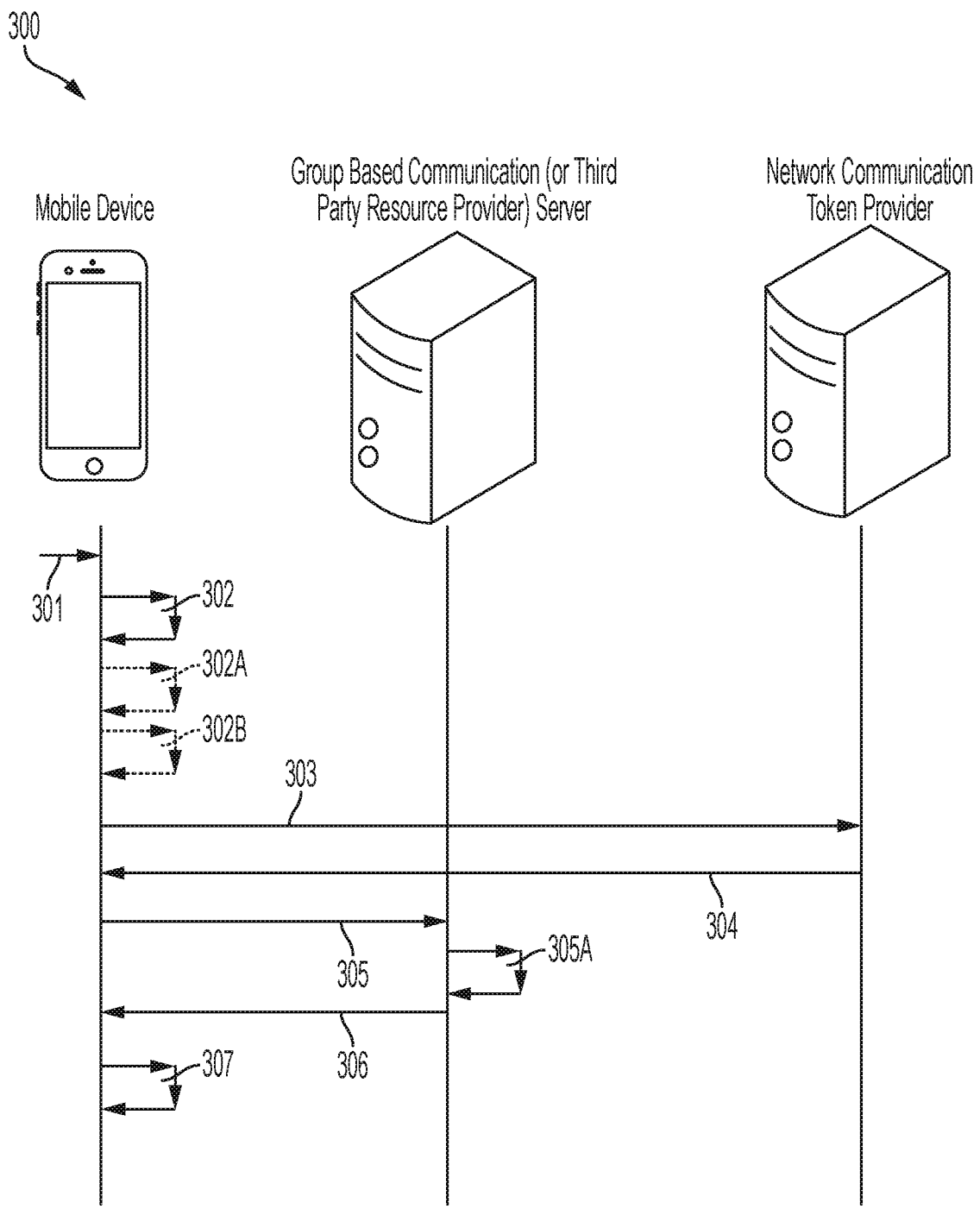
FIG. 4A illustrates an exemplary data flow among components of a notification signal disruption diagnosis system according to one embodiment.
Figure 4B:
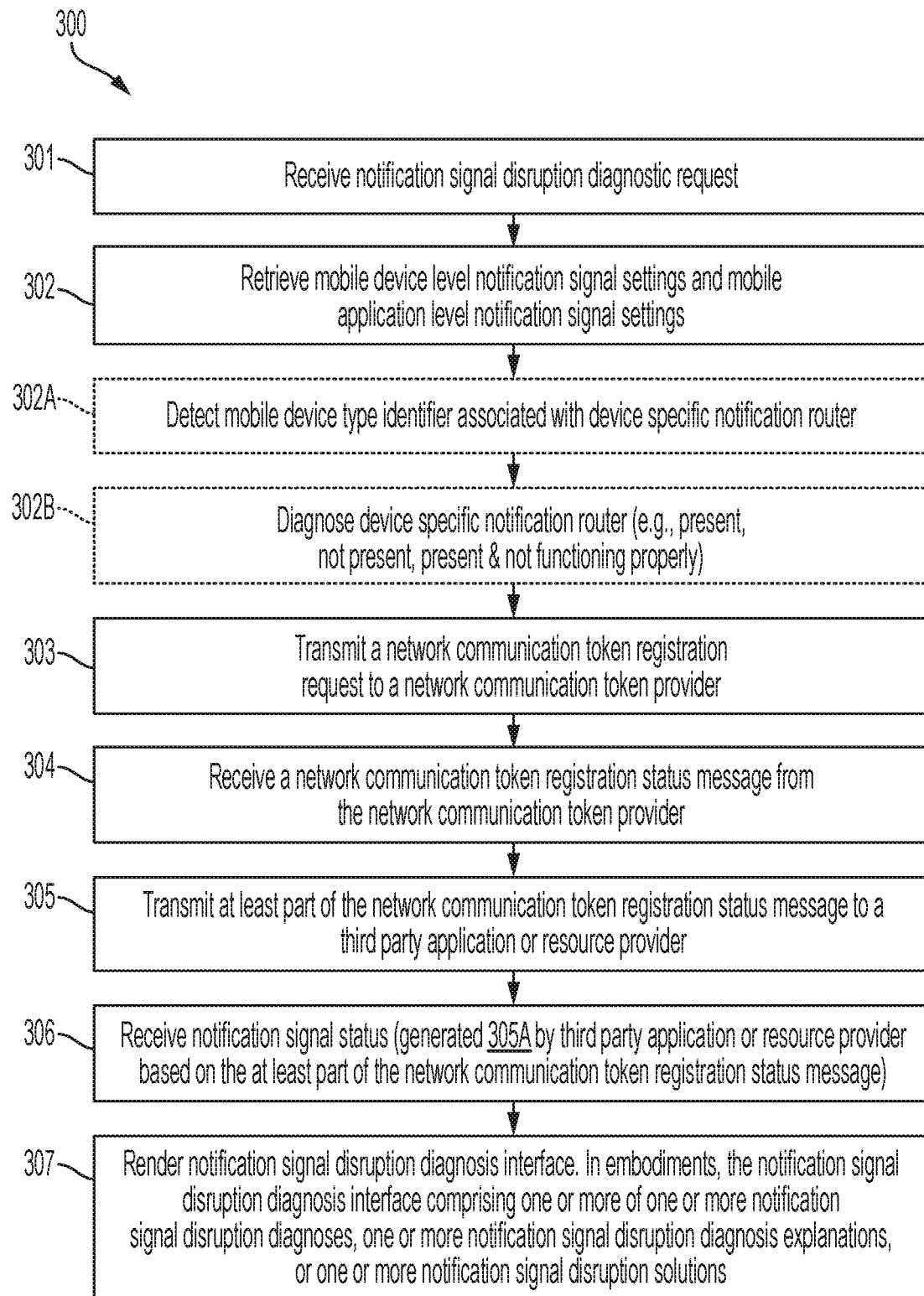
FIG. 4B illustrates an exemplary data flow among components of a notification signal disruption diagnosis system according to one embodiment.

FIGS. 4A and 4B illustrate an exemplary data flow 300 among components of a notification signal disruption diagnosis system according to one embodiment.

In embodiments, a process 300 for diagnosing notification signal disruptions begins with receiving 301, by a mobile device (i.e., client device 101) a notification signal disruption diagnostic request.

In embodiments, the process 300 continues with the mobile device (e.g., client device 101) retrieving 302, from a local mobile device memory, mobile device level notification signal settings and mobile application level notification signal settings. In embodiments, retrieving the mobile device level notification signal settings and the mobile application level notification signal settings may be accomplished through the use of one or more APIs (application programming interfaces) configured for analyzing and retrieving such information.

In embodiments, the process 300 continues with optionally (by the mobile device) detecting 302A a mobile device type identifier associated with a device specific notification router. In embodiments, the mobile device type identifier was received as part of the notification signal disruption diagnostic request. In embodiments, retrieving a status of a notification router associated with a mobile device type may be accomplished through the use of one or more APIs (application programming interfaces) configured for analyzing and retrieving such information.

In embodiments, the process 300 continues with optionally (by the mobile device) determining 302B a device specific notification router diagnosis by detecting 302B whether a device specific notification router is present on the mobile device, not present on the mobile device, or present but not functioning properly on the mobile device.

In embodiments, the process 300 continues with the mobile device (e.g., client device 101) transmitting 303, to a network communication token provider (e.g., network communication token provider 410) a network communication token registration request.

In embodiments, the process 300 continues with the mobile device (e.g., client device 101) receiving 304, from the network communication token provider (e.g., network communication token provider 410), a network communication token registration status message. In embodiments, the network communication token registration status message comprises one of a valid network communication token or a network communication token registration error.

In embodiments, the process 300 continues with the mobile device (e.g., client device 101) transmitting 305, to a third party resource or application provider (e.g., group-based communication system 105 or third party resource provider 400), at least part of the network communication token registration message.

In embodiments, the process 300 continues with the mobile device (e.g., client device 101) receiving 306, from the third party resource or application provider (e.g., group-based communication system 105 or third party resource provider 400), a notification signal status. In embodiments, the notification signal status is generated 305A by the third party resource or application provider based on the at least part of the network communication token registration message.

In embodiments, the process 300 continues with the mobile device (e.g., client device 101 rendering 307, for display via a local mobile device display, a notification signal disruption diagnosis interface. In embodiments, the notification signal disruption diagnosis interface comprises one or more notification signal disruption diagnoses, one or more notification signal disruption diagnosis explanations, and one or more notification signal disruption solutions.

In embodiments, a notification signal disruption diagnosis comprises one of a mobile device level notification signal disruption diagnosis, a mobile application level notification signal disruption diagnosis, or a network communication token disruption diagnosis.

In embodiments, mobile application level notification signal settings are associated with a third party resource identifier. In embodiments, mobile device level notification signal settings comprise mobile application specific notification signal settings associated with the third party resource identifier.

Figure 5A:
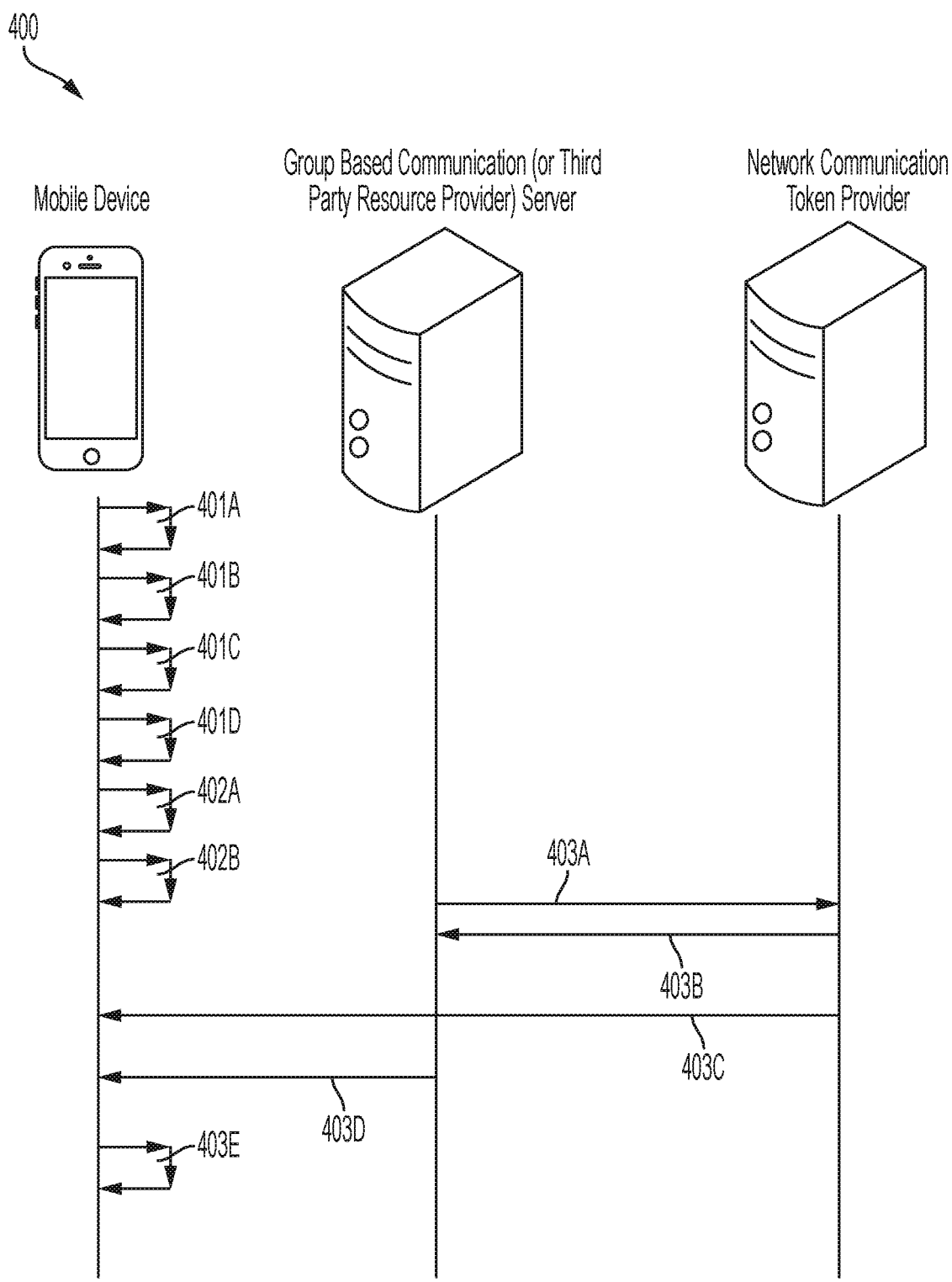
FIG. 5A illustrates an exemplary data flow among components of a notification signal disruption diagnosis system according to one embodiment.
Figure 5B:
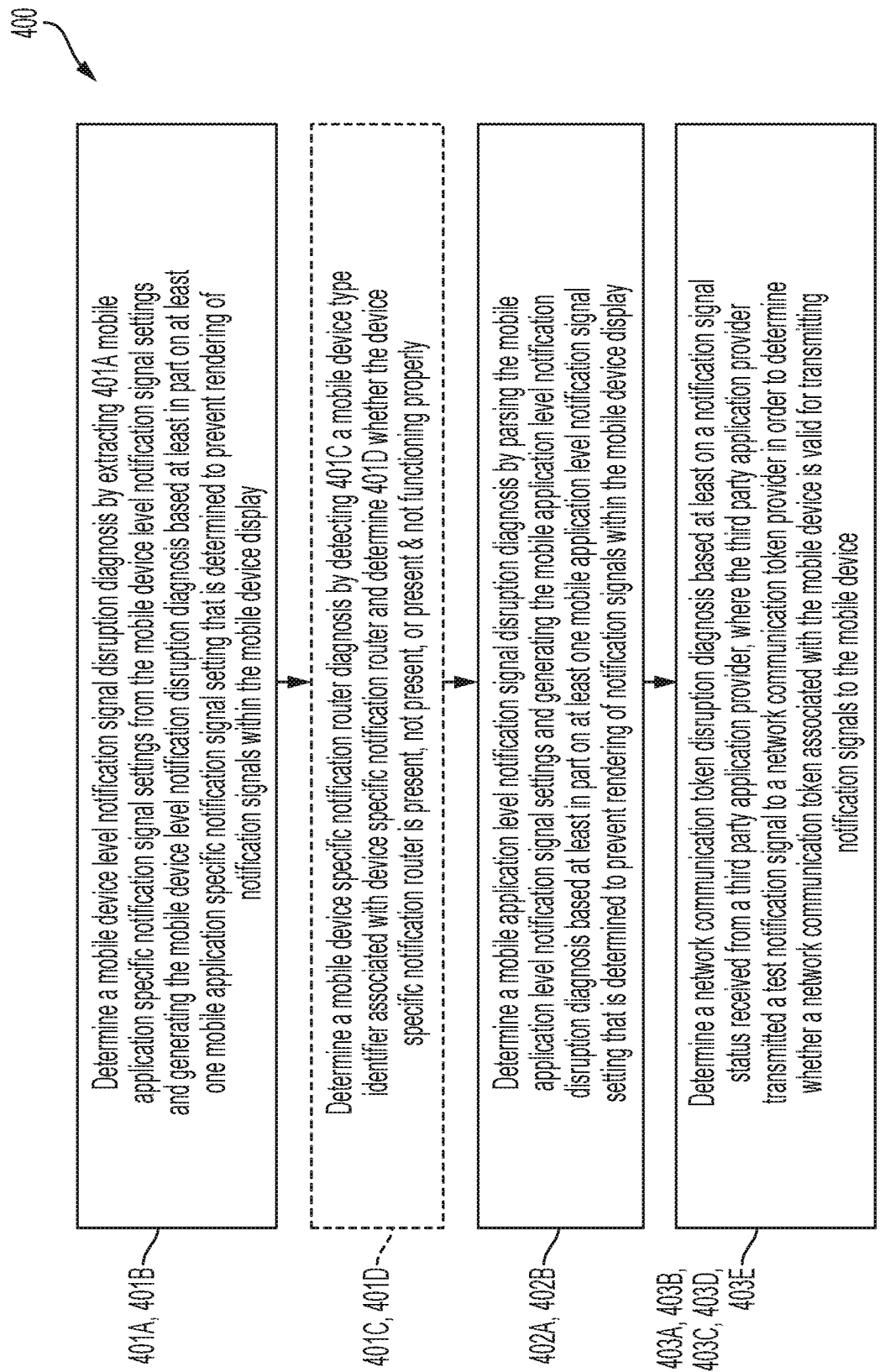
FIG. 5B illustrates an exemplary data flow among components of a notification signal disruption diagnosis system according to one embodiment.

FIGS. 5A and 5B illustrate an exemplary data flow 400 among components of a notification signal disruption system according to one embodiment.

In embodiments, a process 400 is performed in parallel with process 300 (or in between steps of process 300). The process 400 includes determining (401A, 401B), by the mobile device (e.g., client device 101) a mobile device level notification signal disruption diagnosis. The mobile device determines the mobile device level notification signal disruption diagnosis by extracting 401A the mobile application specific notification signal settings from the mobile device level notification signal settings, and generating 401B the mobile device level notification signal disruption diagnosis based at least in part on at least one mobile application specific notification signal setting that is determined to prevent rendering of notification signals within the mobile device display.

In embodiments, generating 401B the mobile device level notification signal disruption diagnosis comprises identifying one or more mobile application specific notification signal settings that may be preventing rendering of notification signals within the mobile device display. A mobile application specific notification signal setting that may be identified as possibly preventing rendering of notification signals within the mobile device display is do not disturb, where a "do not disturb" flag associated with the mobile application prevents any notifications associated with the mobile application from being rendered within the mobile device display. A mobile application specific notification signal setting that may be identified as possibly preventing rendering of notification signals within the mobile device display is one or more group-based communication channel specific notification signal settings identifying one or more group-based communication channel identifiers that, when notification signals are associated with the group-based communication channel identifiers, the notification signals are prevented from being rendered within the mobile device display. A mobile application specific notification signal setting that may be identified as possibly preventing rendering of notification signals within the mobile device display is one or more group-based communication keyword specific notification signal settings identifying one or more keywords that, when appearing in a group-based communication message, file, or other object, notifications associated with those group-based communication messages, files, or other objects are prevented from being rendered within the mobile device display. A mobile application specific notification signal setting that may be identified as possibly preventing rendering of notification signals within the mobile device display is one or more group-based communication user specific notification signal settings identifying one or more user identifiers that, when notification signals are associated with the group-based communication user identifiers, the notification signals are prevented from being rendered within the mobile device display. The present system identifies those mobile application specific notification signal settings in order to provide the mobile application level notification signal disruption diagnosis and explanation(s).

In embodiments, the process 400 further includes determining (402A, 402B), by the mobile device (e.g., client device 101), a mobile application level notification signal disruption diagnosis. The mobile device determines the mobile application level notification signal disruption diagnosis by parsing 402A the mobile application level notification signal settings, and generating 402B the mobile application level notification signal disruption diagnosis based at least in part on at least one mobile application level notification signal setting that is determined to prevent rendering of notification signals within the mobile device display.

In embodiments, generating 402B the mobile application level notification signal disruption diagnosis comprises identifying one or more mobile application level notification signal settings that may be preventing rendering of notification signals within the mobile device display. A mobile application level notification signal setting that may be identified as possibly preventing rendering of notification signals within the mobile device display is do not disturb, where a "do not disturb" flag associated with the mobile application prevents any notifications associated with the mobile application from being rendered within the mobile device display. A mobile application level notification signal setting that may be identified as possibly preventing rendering of notification signals within the mobile device display is one or more group-based communication channel specific notification signal settings identifying one or more group-based communication channel identifiers that, when notification signals are associated with the group-based communication channel identifiers, the notification signals are prevented from being rendered within the mobile device display. A mobile application level notification signal setting that may be identified as possibly preventing rendering of notification signals within the mobile device display is one or more group-based communication keyword specific notification signal settings identifying one or more keywords that, when appearing in a group-based communication message, file, or other object, notifications associated with those group-based communication messages, files, or other objects are prevented from being rendered within the mobile device display. A mobile application level notification signal setting that may be identified as possibly preventing rendering of notification signals within the mobile device display is one or more group-based communication user specific notification signal settings identifying one or more user identifiers that, when notification signals are associated with the group-based communication user identifiers, the notification signals are prevented from being rendered within the mobile device display. The present system identifies those mobile application level notification signal settings in order to provide the mobile application level notification signal disruption diagnosis and explanation(s).

Generating a diagnosis according to embodiments of the present disclosure may comprise comparing notification signal settings to the contents of a look up table. For example, in embodiments, identifying those notification signal settings that may be responsible for disruptions in notification signal delivery and rendering may be associated with consulting a look up table such that the notification signal settings within the look up table are known to cause disruptions and therefore their presence in the look up table indicates their possible responsibility.

Generating a diagnosis according to embodiments of the present disclosure may comprise traversing notification signal settings to identify those notification signal settings known to be responsible for disruptions in notification signal delivery and rendering. For example, the present system may retrieve a notification signal of "do not disturb" and retrieve from local memory an indication associated with a "do not disturb" notification signal setting that such a notification signal setting disrupts notification signal delivery or rendering. The same applies to other notification signal settings within the scope of the present disclosure.

In embodiments, a mobile application level notification signal setting is one of do not disturb, a group-based communication channel specific notification signal setting, a group-based communication group specific notification signal setting, a group-based communication keyword specific notification signal setting, or a group-based communication user specific notification signal setting. It will be appreciated that "do not disturb" settings may be customized according to time of day, etc., as explained above.

In embodiments, a mobile application specific notification signal setting is one of do not disturb, a group-based communication channel specific notification signal setting, a group-based communication group specific notification signal setting, a group-based communication keyword specific notification signal setting, or a group-based communication user specific notification signal setting. It will be appreciated that "do not disturb" settings may be customized according to time of day, etc., as explained above.

In embodiments, the process 400 includes receiving 403C, by the mobile device (e.g., client device 101) and from a network communication token provider (e.g., network communication token provider 410), a test notification signal. It will be appreciated that operations 403A, 403B, 403C, and 403D occur, in embodiments, after operations 303 and 304 depicted in FIGS. 4AB and 4B. In embodiments, the test notification signal is transmitted 403A by the third party application provider (e.g., group based communication system 105 or third party resource provider 400) to the network communication token provider using the valid network communication token. The third party resource provider may receive 403B a notification signal status from the network communication token provider indicating whether the test notification was successfully delivered or not.

In embodiments, the process 400 includes receiving 403D, by the mobile device (e.g., client device 101) and from the third party application provider, a notification signal status. In embodiments, the notification signal status comprises one of a test notification signal success or a test notification signal failure.

In embodiments, the process 400 includes determining 403E, by the mobile device (e.g., client device 101) a network communication token disruption diagnosis based at least on the notification signal status.

FIGS. 6A, 6B, 6C, 6D, and 6E each illustrate an exemplary notification signal disruption diagnosis interface 600 (shown both with and without annotations), for use with embodiments of the present disclosure. In embodiments, notification signal disruption diagnosis interface 600 comprises a mobile application level notification signal diagnosis pane 601, an optional mobile device specific notification router diagnosis pane 602, a mobile device level notification signal diagnosis pane 603, a network communication disruption diagnosis pane 604, a test notification status pane 605, and one or more notification signal disruption solution panes 606.

In embodiments, a notification signal disruption solution associated with the mobile device level notification signal disruption diagnosis comprises a mobile device level notification signal settings interface element with which a user of the mobile device may interact using the mobile device.

In embodiments, a notification signal disruption solution associated with the mobile application level notification signal disruption diagnosis comprises a mobile application level notification signal settings interface element with which a user of the mobile device may interact using the mobile device (e.g., "Open Notification Settings" shown in

Figure 6A:
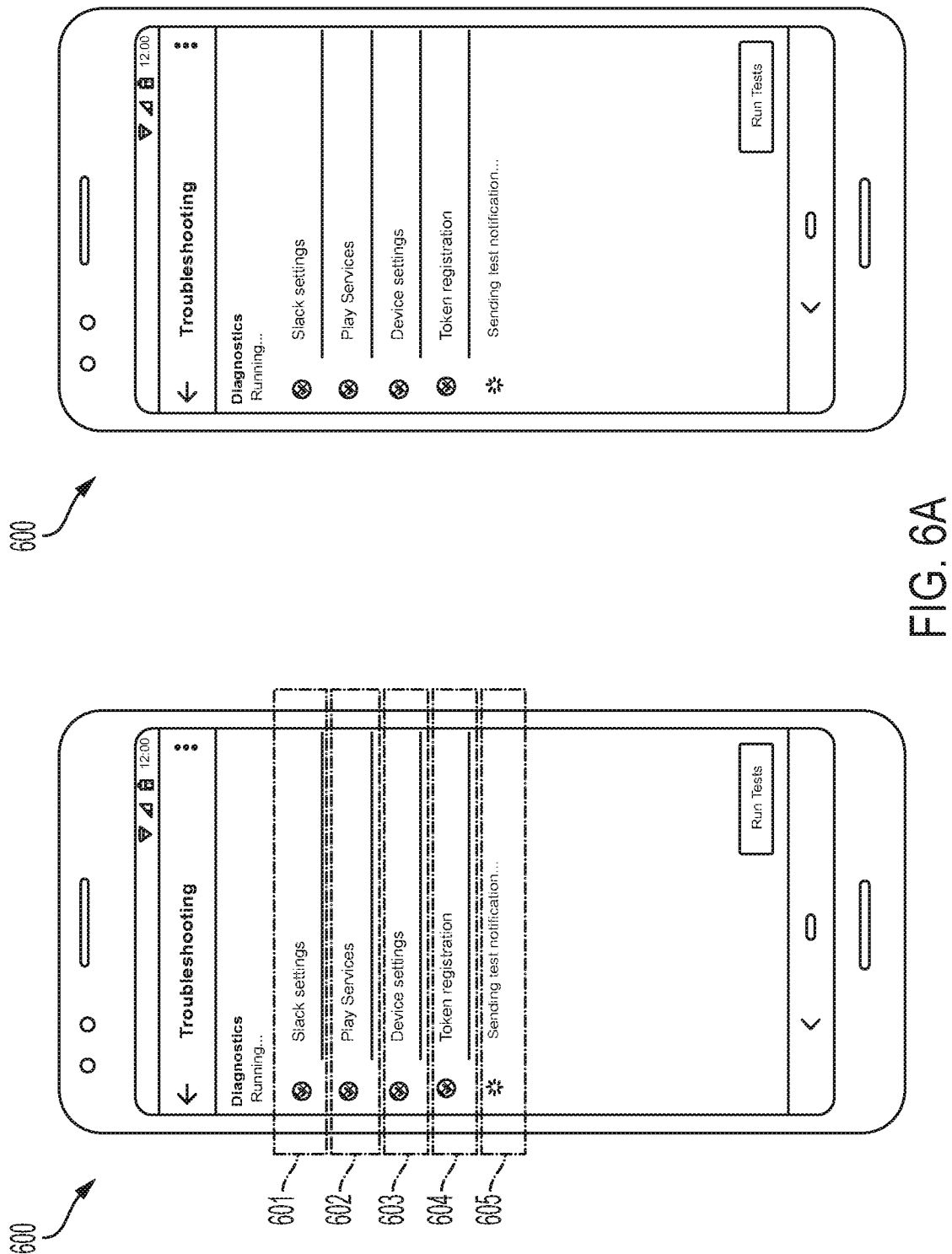
FIG. 6A illustrates an exemplary notification signal disruption diagnosis interface, for use with embodiments of the present disclosure.
Figure 6B:
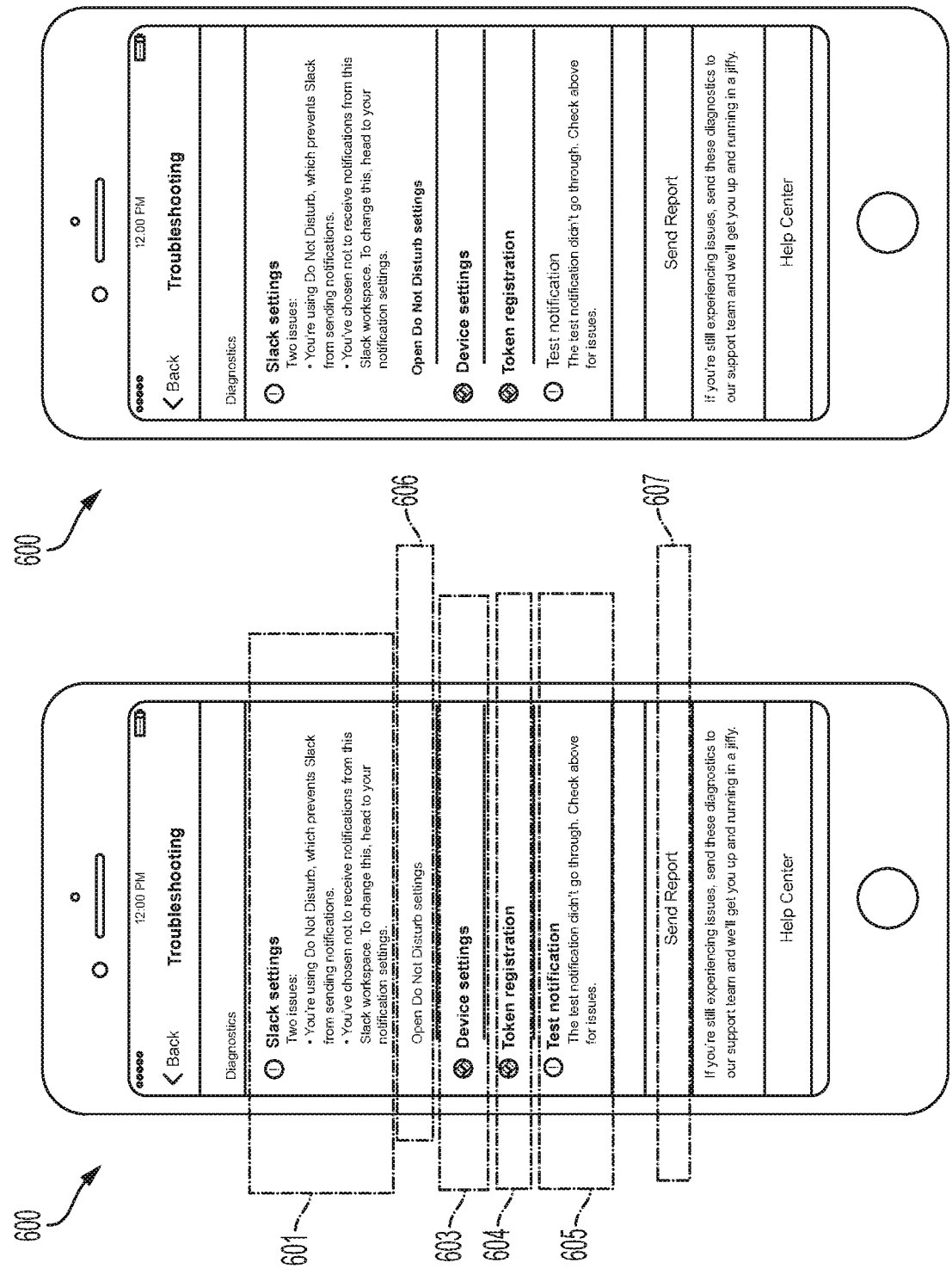
FIG. 6B illustrates an exemplary notification signal disruption diagnosis interface, for use with embodiments of the present disclosure.
Figure 6C:
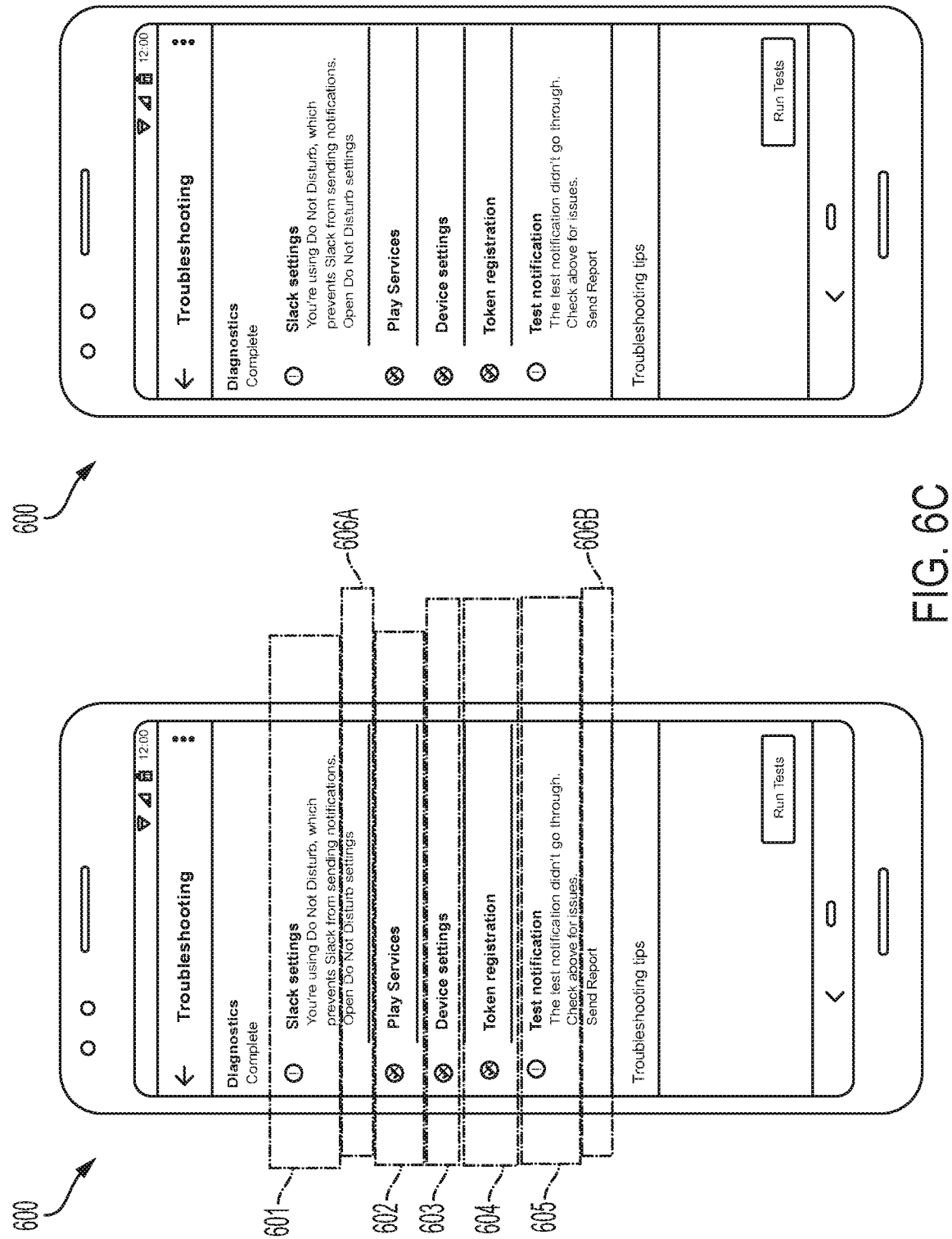
FIG. 6C illustrates an exemplary notification signal disruption diagnosis interface, for use with embodiments of the present disclosure.
Figure 6D:
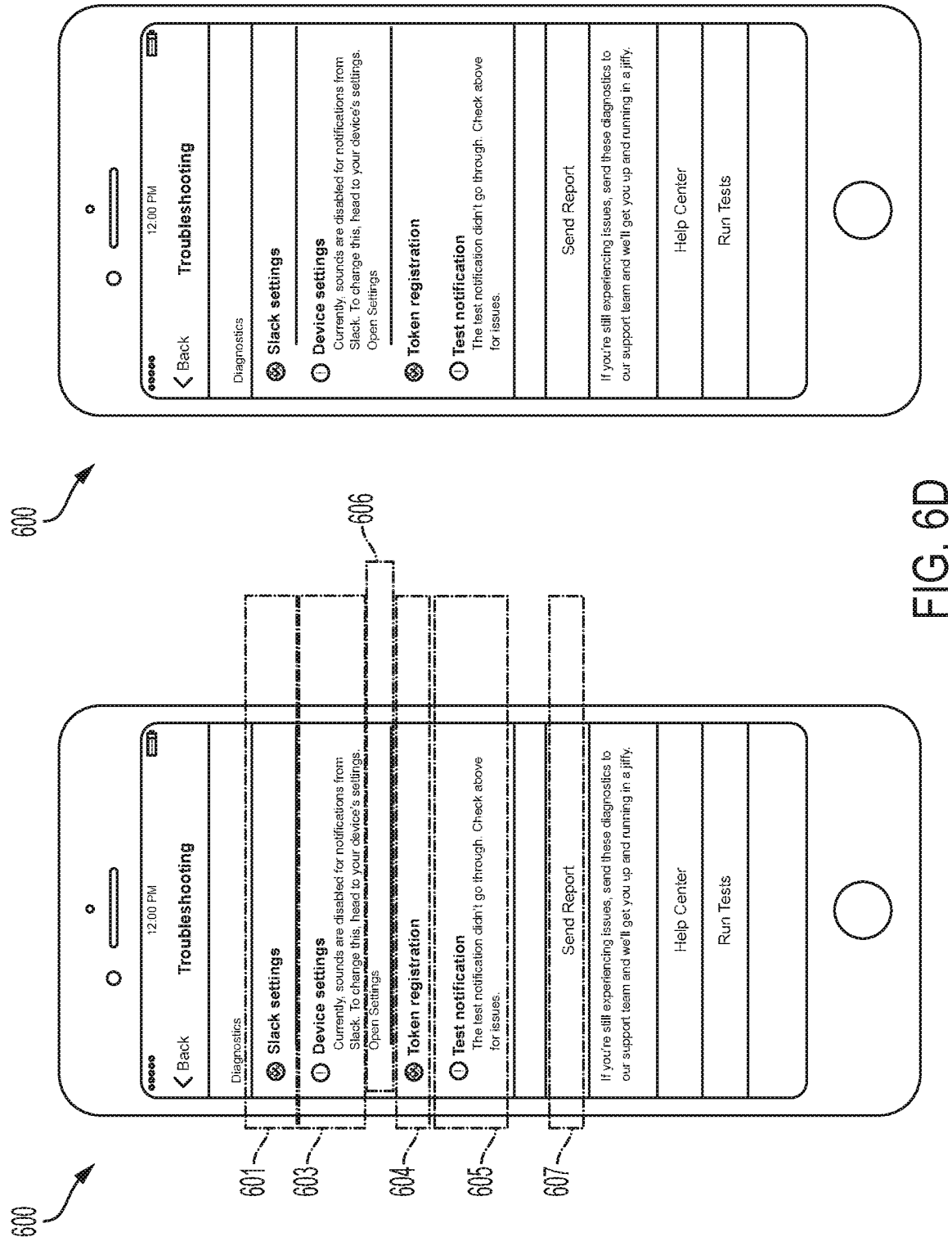
FIG. 6D illustrates an exemplary notification signal disruption diagnosis interface, for use with embodiments of the present disclosure.

606 of FIG. 6B; "Open Do Not Disturb Settings" shown in 606A of FIG. 6C; "Send Report" shown in 606B in FIG. 6C; "Open Settings" shown in 606 of FIG. 6D). It will be appreciated that a notification signal disruption diagnosis interface 600 may comprise more than one notification signal disruption solution panes 606. It will be appreciated that additional solution options may be presented within the interface without departing from the scope of the present disclosure (e.g., 'Send Report" 607 in FIGS. 6B, 6D). It will also be appreciated that a test notification signal may be rendered 608 within the notification signal disruption diagnosis interface 600 (e.g., by way of overlay as push notification).

In embodiments, a notification signal disruption solution associated with the network communication token disruption diagnosis comprises a network communication token repair interface element.

In embodiments, the notification signal disruption diagnosis interface may further comprise an interface element 605 associated with a test notification signal.

In embodiments, the mobile device level notification signal disruption diagnosis is renderable within the mobile device level notification signal diagnosis pane 603, the mobile application level notification signal diagnosis disruption is renderable within the mobile application level notification signal diagnosis pane 601, the network communication disruption diagnosis is renderable within the network communication disruption diagnosis pane 604, and the one or more notification signal disruption solutions are renderable within the one or more notification signal disruption solution panes 604.

Details regarding various embodiments are described in the attached appendices, the contents of which are hereby incorporated herein by reference in their entirety.

Additional Implementation Details

Although example processing systems have been described in the accompanying figures, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. An apparatus for diagnosing notification signal disruptions, the apparatus comprising at least one processor and at least one memory storing instructions that, with the at least one processor, cause the apparatus to, in response to receiving a notification signal disruption diagnostic request:

retrieve, from a local mobile device memory, mobile device level notification signal settings and mobile application level notification signal settings;

transmit, to a network communication token provider, a network communication token registration request;

receive, from the network communication token provider, a network communication token registration status message, the network communication token registration status message comprising one of a valid network communication token or a network communication token registration error;

transmit, to a third party application provider, at least part of the network communication token registration status message;

receive, from the third party application provider, a notification signal status, the notification signal status generated by the third party application provider based on the at least part of the network communication token registration status message; and render, for display via a local mobile device display, a notification signal disruption diagnosis interface.

2. The apparatus of claim 1, wherein a notification signal disruption diagnosis comprises one of a mobile device level notification signal disruption diagnosis, a mobile application level notification signal disruption diagnosis, or a network communication token disruption diagnosis.

3. The apparatus of claim 2, wherein the mobile application level notification signal settings are associated with a third party resource identifier.

4. The apparatus of claim 3, wherein the mobile device level notification signal settings comprise mobile application specific notification signal settings associated with the third party resource identifier.

5. The apparatus of claim 4, wherein the at least one processor and at least one memory storing instructions that, with the at least one processor, further cause the apparatus to determine a mobile device level notification signal disruption diagnosis by:
 extracting the mobile application specific notification signal settings from the mobile device level notification settings; and
 generating the mobile device level notification signal disruption diagnosis based at least in part on at least one mobile application specific notification signal setting that is determined to prevent rendering of notification signals within the mobile device display.

6. The apparatus of claim 5, wherein a notification signal disruption solution associated with the mobile device level notification signal disruption diagnosis comprises a mobile device level notification signal settings interface element with which a user of the mobile device may interact using the mobile device.

7. The apparatus of claim 5, wherein a mobile application specific notification signal setting is one of a group-based communication channel specific notification signal setting, a group-based communication group specific notification signal setting, a group-based communication keyword specific notification signal setting, or a group-based communication user specific notification signal setting.

8. The apparatus of claim 2, wherein the at least one processor and at least one memory storing instructions that, with the at least one processor, further cause the apparatus to determine a mobile application level notification signal disruption diagnosis by:
 parsing the mobile application level notification signal settings; and
 generating the mobile application level notification signal disruption diagnosis based at least in part on at least one mobile application level notification signal setting that is determined to prevent rendering of notification signals within the mobile device display.

9. The apparatus of claim 8, wherein a notification signal disruption solution associated with the mobile application level notification signal disruption diagnosis comprises a mobile application level notification signal settings interface element with which a user of the mobile device may interact using the mobile device.

10. The apparatus of claim 8, wherein a mobile application level notification signal setting is one of a group-based communication channel specific notification signal setting, a group-based communication group specific notification signal setting, a group-based communication keyword specific notification signal setting, or a group-based communication user specific notification signal setting.

11. The apparatus of claim 2, wherein the at least one processor and at least one memory storing instructions that, with the at least one processor, further cause the apparatus to determine a network communication token disruption diagnosis based at least on the notification signal status.

12. The apparatus of claim 11, wherein a notification signal disruption solution associated with the network communication token disruption diagnosis comprises a network communication token repair interface element.

13. The apparatus of claim 1, wherein the notification signal disruption diagnosis interface comprises one or more of a mobile device level notification signal diagnosis pane, a mobile application level notification signal diagnosis pane, a network communication disruption diagnosis pane, or one or more notification signal disruption solution panes.

14. The apparatus of claim 13, wherein the mobile device level notification signal disruption diagnosis is renderable within the mobile device level notification signal diagnosis pane, the mobile application level notification signal diagnosis disruption is renderable within the mobile application level notification signal diagnosis pane, the network communication disruption diagnosis is renderable within the network communication disruption diagnosis pane, and the one or more notification signal disruption solutions are renderable within the one or more notification signal disruption solution panes.

15. The apparatus of claim 1, wherein the at least one processor and at least one memory storing instructions that, with the at least one processor, further cause the apparatus to:
 receive, from a network communication token provider, a test notification signal, wherein the test notification signal is transmitted by the third party application provider to the network communication token provider using the valid network communication token; and
 receive, from the third party application provider, a notification signal status comprising one of a test notification signal success or a test notification signal failure.

16. The apparatus of claim 1, wherein the notification signal disruption diagnosis interface comprises one or more of one or more notification signal disruption diagnoses, one or more notification signal disruption diagnosis explanations, or one or more notification signal disruption solutions.

17. A computer program product for diagnosing notification signal disruptions associated with a mobile device, the computer program product comprising at least one non-transitory computer-readable storage medium having computer-executable program code instructions stored therein, the computer-executable program code instructions, in execution with a processor, configured to, in response to receiving a notification signal disruption diagnostic request:
 retrieve, from a local mobile device memory, mobile device level notification signal settings and mobile application level notification signal settings;
 transmit, to a network communication token provider, a network communication token registration request;
 receive, from the network communication token provider, a network communication token registration status message, the network communication token registration status message comprising one of a valid network communication token or a network communication token registration error;
 transmit, to a third party application provider, at least part of the network communication token registration status message;
 receive, from the third party application provider, a notification signal status, the notification signal status generated by the third party application provider based on the at least part of the network communication token registration status message; and
 render, for display via a local mobile device display, a notification signal disruption diagnosis interface.

18. The computer program product of claim 17, wherein the notification signal disruption diagnosis interface comprises one or more of a mobile device level notification signal diagnosis pane, a mobile application level notification signal diagnosis pane, a network communication disruption diagnosis pane, or one or more notification signal disruption solution panes.

19. The computer program product of claim 17, wherein the computer-executable program code instructions, in execution with a processor, are further configured to:

receive, from a network communication token provider, a test notification signal, wherein the test notification signal is transmitted by the third party application provider to the network communication token provider using the valid network communication token; and receive, from the third party application provider, a notification signal status comprising one of a test notification signal success or a test notification signal failure.

20. A computer implemented method for diagnosing notification signal disruptions associated with a mobile device, comprising, in response to receiving a notification signal disruption diagnostic request:

retrieving, from a local mobile device memory, mobile device level notification signal settings and mobile application level notification signal settings;

transmitting, to a network communication token provider, a network communication token registration request;

receiving, from the network communication token provider, a network communication token registration status message, the network communication token registration status message comprising one of a valid network communication token or a network communication token registration error;

transmitting, to a third party application provider, at least part of the network communication token registration status message;

receiving, from the third party application provider, a notification signal status, the notification signal status generated by the third party application provider based on the at least part of the network communication token registration status message; and rendering, for display via a local mobile device display, a notification signal disruption diagnosis interface.

* * * * *